United States Patent [19]

Kedem et al.

[11] Patent Number: 4,649,498
[45] Date of Patent: Mar. 10, 1987

[54] COMPUTER SYSTEMS FOR CURVE-SOLID CLASSIFICATION AND SOLID MODELING

[75] Inventors: Gershon Kedem, Rochester; John L. Ellis, Rush, both of N.Y.

[73] Assignee: The University of Rochester, Rochester, N.Y.

[21] Appl. No.: 608,295

[22] Filed: May 8, 1984

[51] Int. Cl.$^4$ .................. G09G 1/06; G06F 15/62
[52] U.S. Cl. .................................. 364/518; 382/25; 340/747; 340/729
[58] Field of Search ............... 364/518, 521; 340/747, 340/729, 750; 382/25

[56] References Cited

U.S. PATENT DOCUMENTS

| | | | |
|---|---|---|---|
| 3,473,160 | 10/1969 | Wahlstrom | 340/750 X |
| 3,889,107 | 6/1975 | Sutherland | 364/518 X |
| 4,205,389 | 5/1980 | Heartz | 340/747 X |
| 4,475,104 | 10/1984 | Shen | 364/521 |
| 4,549,275 | 10/1985 | Sukonick | 340/729 |

OTHER PUBLICATIONS

Unger, S. H., "Pattern Detection and Recognition", *Proceedings of the IRE*, 1959, pp. 1737-1751.
Sutherland et al., "Sorting and the Hidden Surface Problem", *National Computer Conference 1973*, 1973, pp. 255-263.
Boinodiris, S., "Computer Graphics Using Multi-Echelon Processing Structures", *IBM Tech. Disc. Bulletin*, vol. 23, No. 9, Feb. 1981, pp. 3996-4005.
Samet, H., "Computing Perimeters of Regions in Images Represented by Quadtrees", *IEEE Transactions on Pattern Analysis and Machine Intelligence*, vol. PAMI-3, No. 6, Nov. 1981, pp. 683-687.
Roth, S. D., "Ray Casting for Modeling Solids", *Computer Graphics and Image Processing*, vol. 18, pp. 109-144, 1982.
Requicha, A. A. G., "Solid Modeling: A Historical Summary and Contemporary Assessment", *IEEE Computer Graphics and Applications*, vol. 2, No. 2, pp. 9-24, Mar. 1982.
Tilove, R. B., "Closure of Boolean Operations on Geometric Entities", *Computer Aided Design*, vol. 12, No. 5, pp. 219-220, Sep. 1980.

Primary Examiner—Felix D. Gruber
Assistant Examiner—Joseph L. Dixon
Attorney, Agent, or Firm—Martin LuKacher

[57] ABSTRACT

A computer system is introduced for curve-solid classification (raycasting) of objects in constructive solid geometry (CSG) modeling to produce image representations of two- or three-dimensional objects. The system carries out curve-solid classifications in parallel and at much higher speed than a general purpose computer. It uses primitive classification processors which compute all of the (curve-line or ray) primitive (basic solid bodies: block, cylinder, etc.) intersections in parallel, combine processors which are connected into a binary tree that duplicates the binary tree defining the CSG solid and computes the set operations (union, intersection and difference), and a host computer.

14 Claims, 46 Drawing Figures

The Curve-Solid Classification System

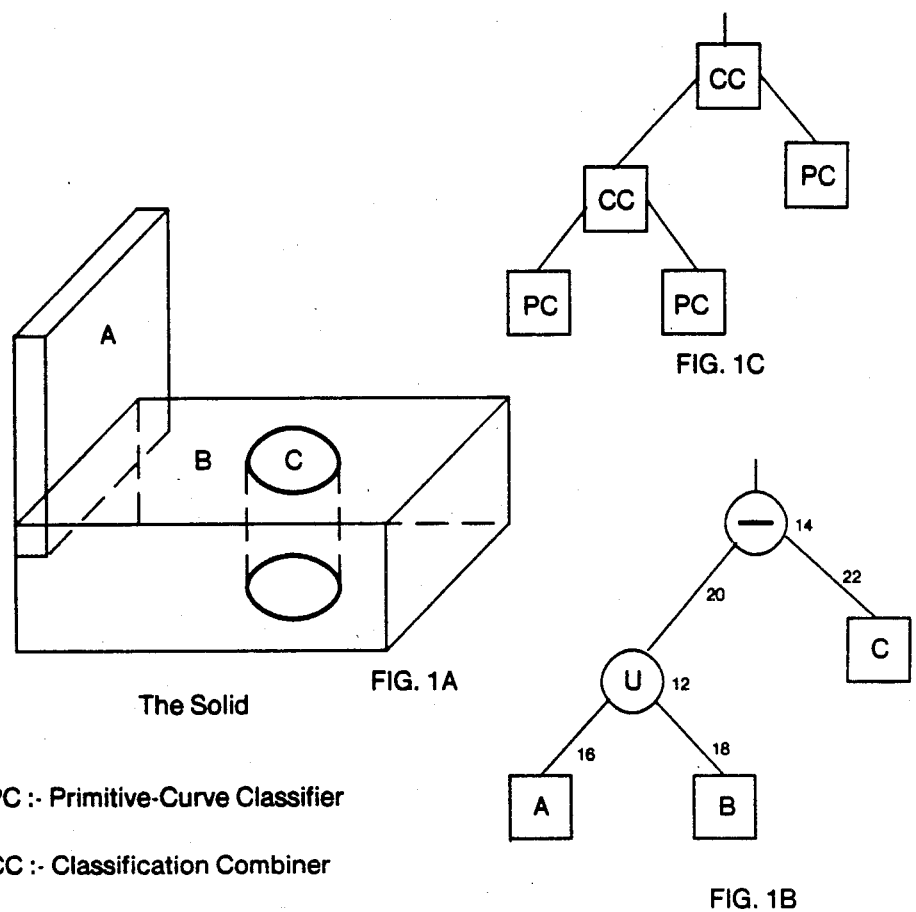
Figure 1 CSG-Solids and Classification

$I_A$
$I_B$
$I_C$
$I_A \cup I_B$
$I_A \cup I_B \cdot I_C$

Line-Solid Classification

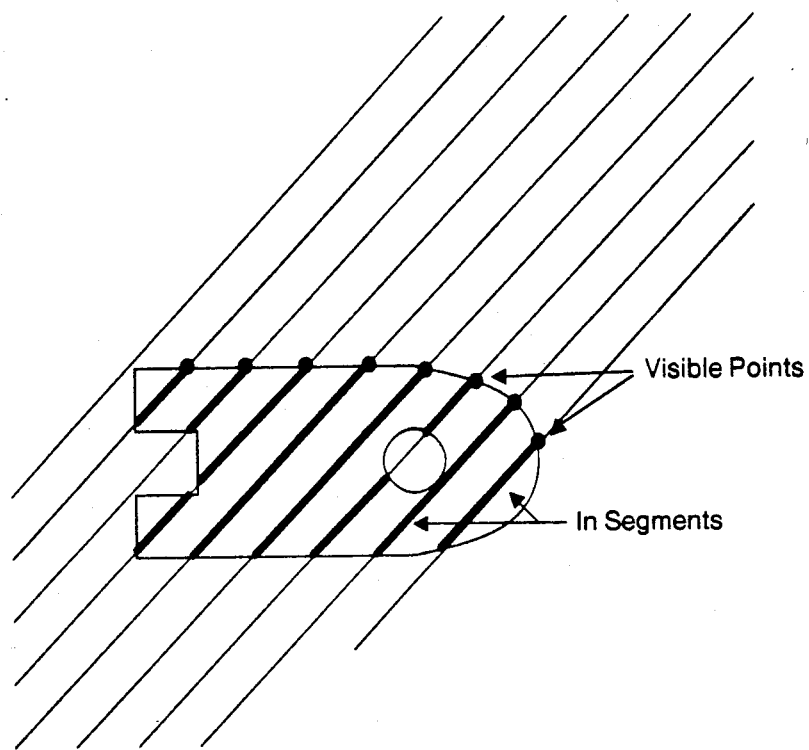
Figure 3: Ray Casting

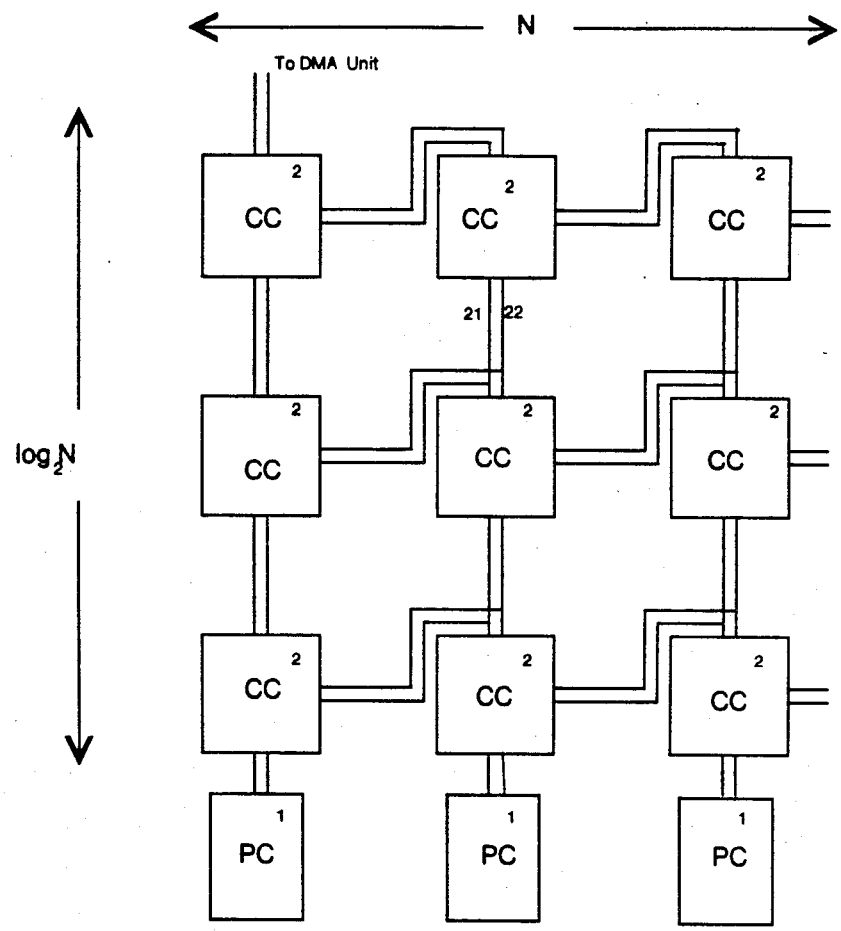
Figure 4: Array of Combine Machines

The imbedding of a binary tree in a grid

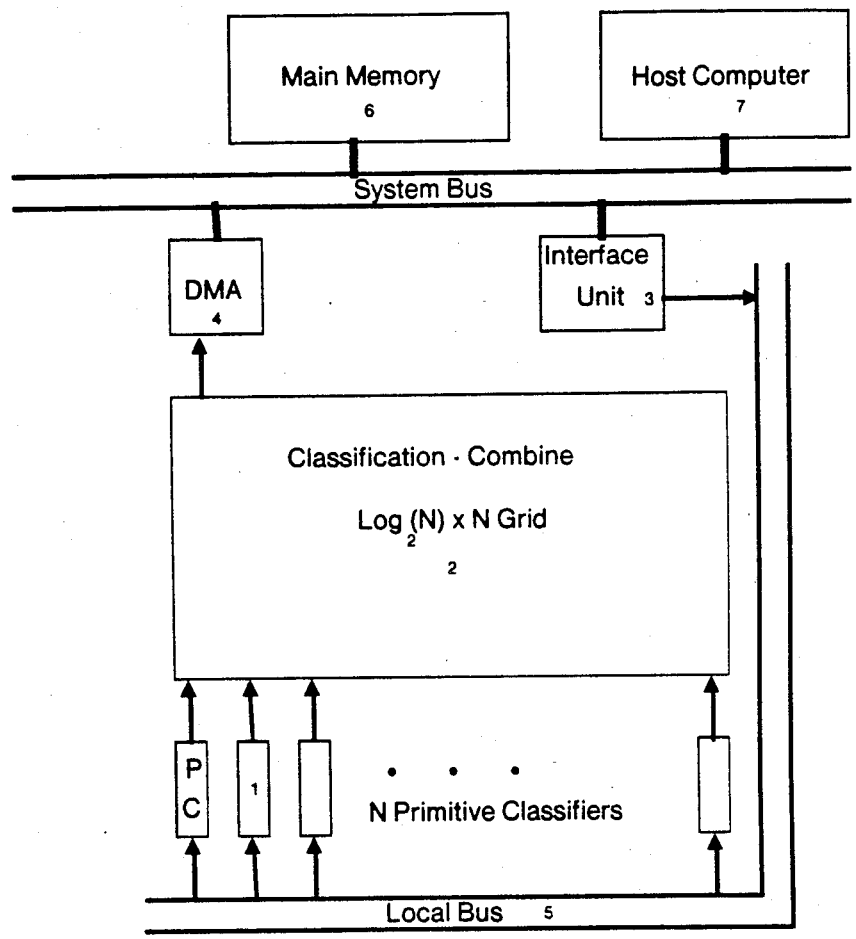
Figure 6: The Curve-Solid Classification System

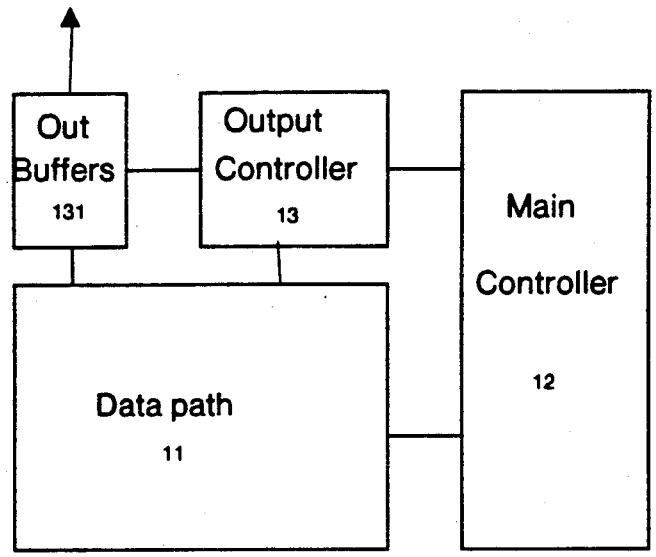
Figure 7: Primitive classifier block diagram

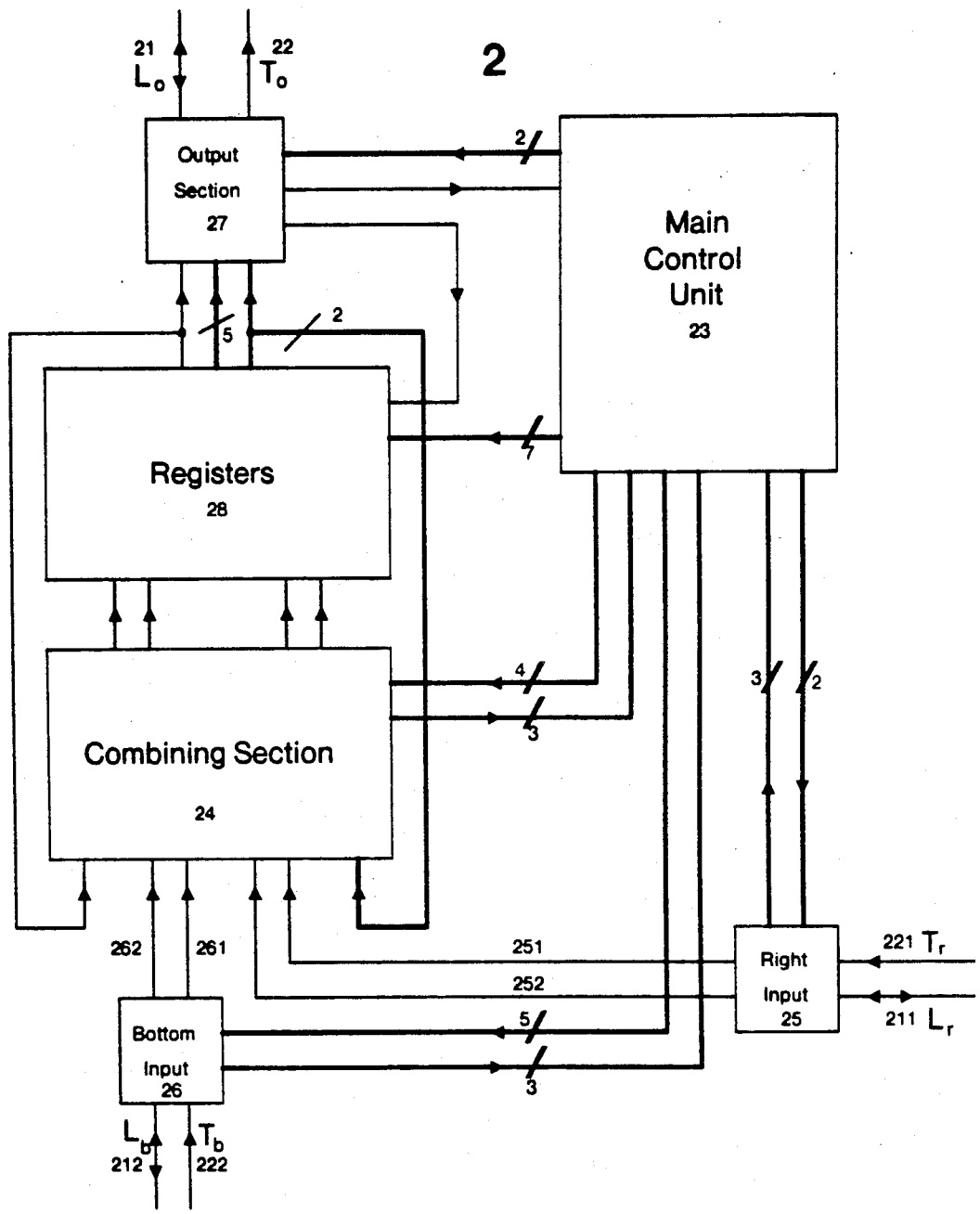
Figure 8: Combine Processor block diagram

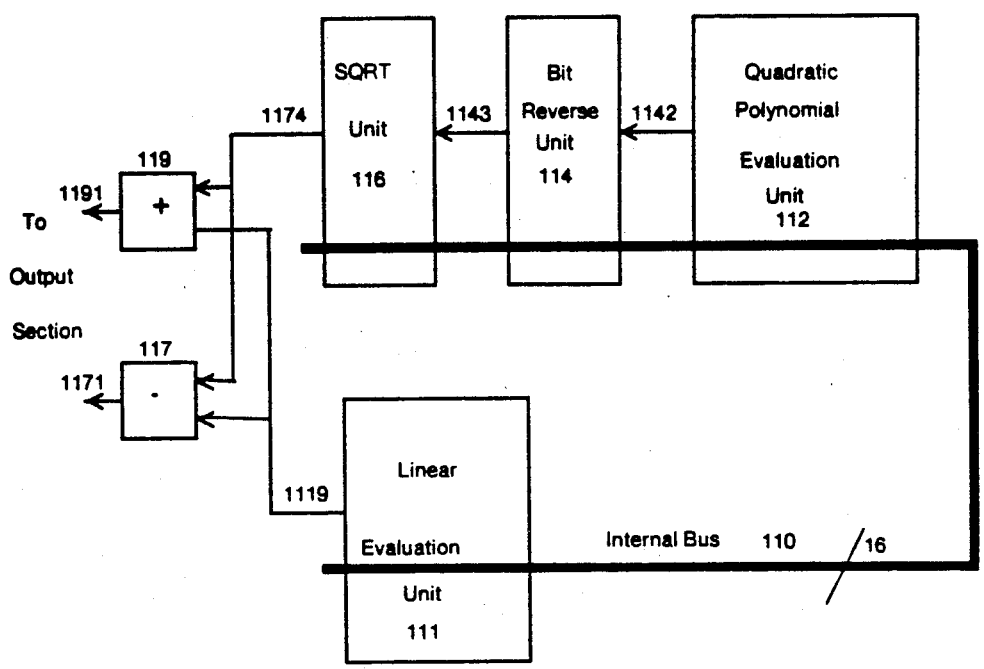
Figure 9: Primitive Classifier Data Path

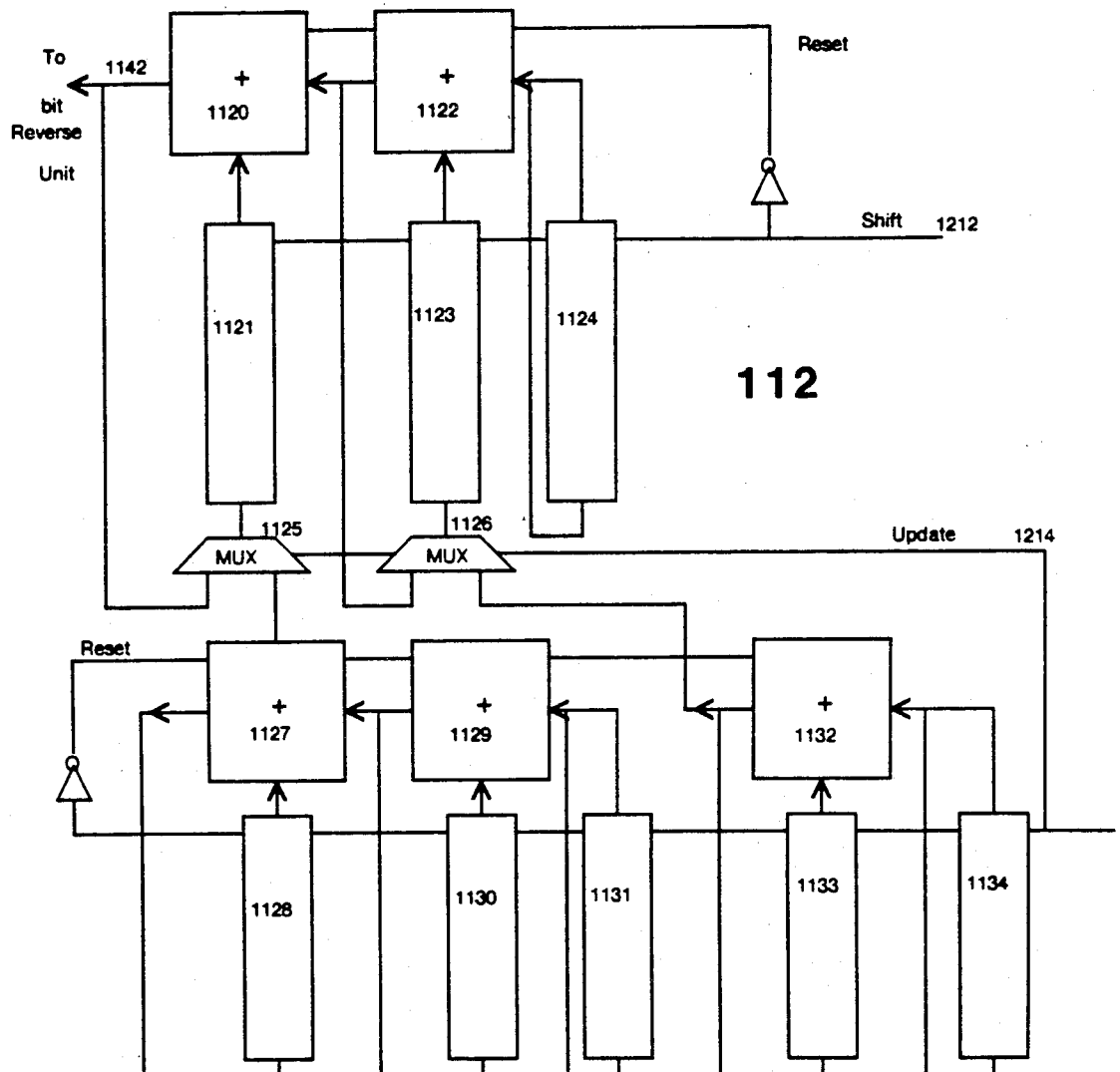
Figure 10: Quadratic Polynomial Evaluation Unit

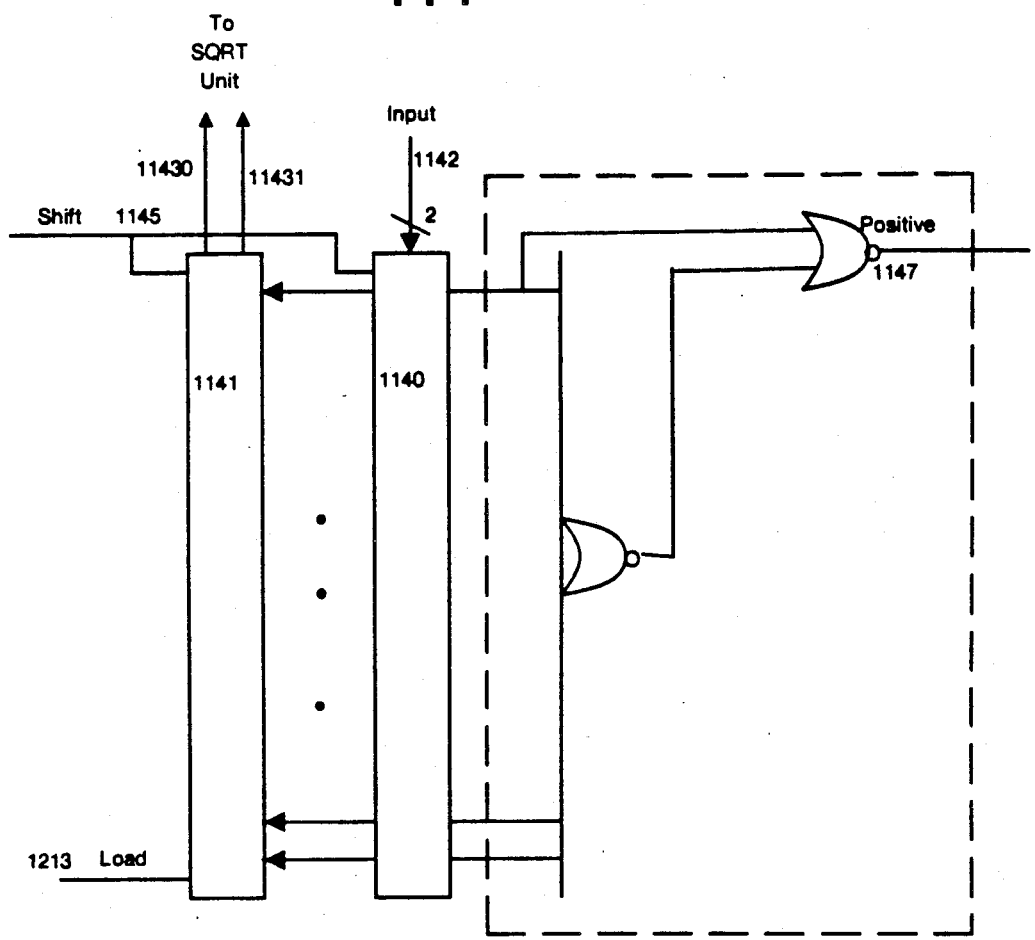
Figure 11: Bit Reverse Unit

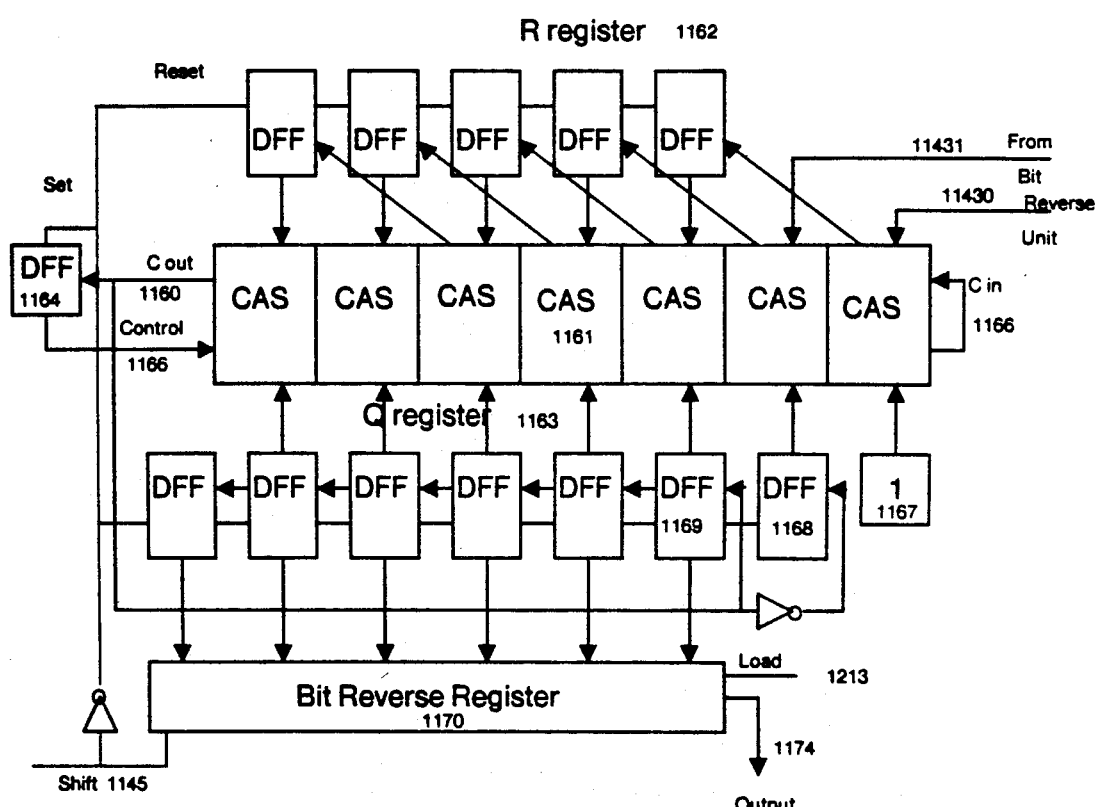
Figure 12: Square Root Unit

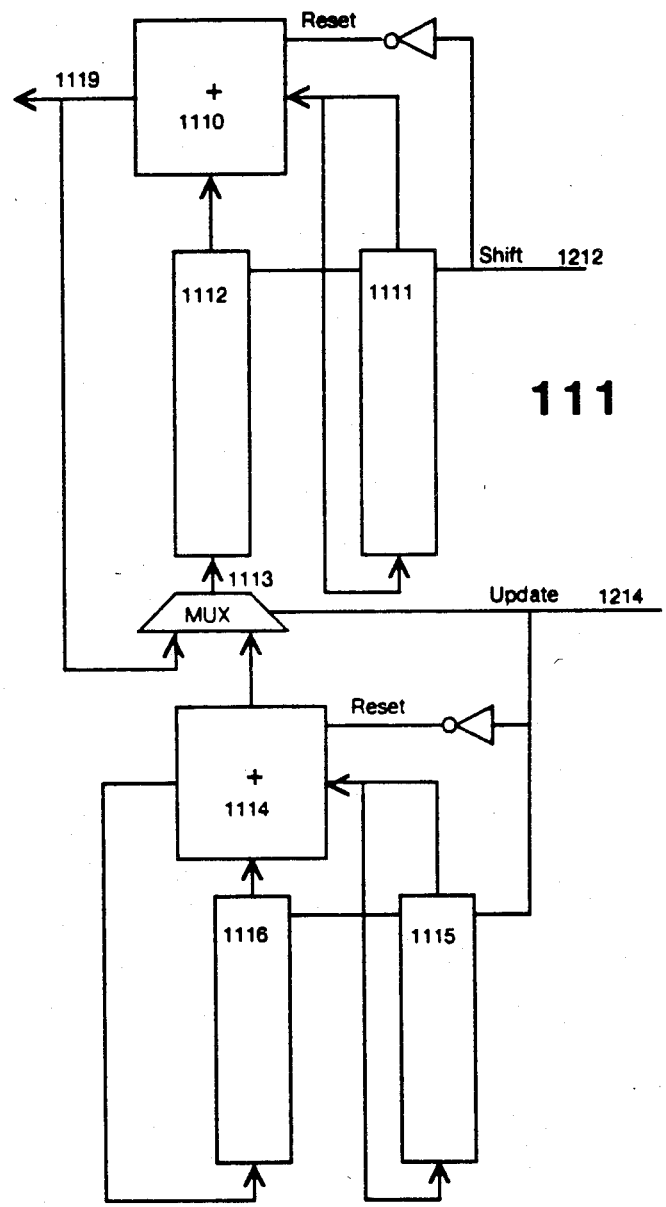
Figure 13: Linear Polynomial Evaluation Unit

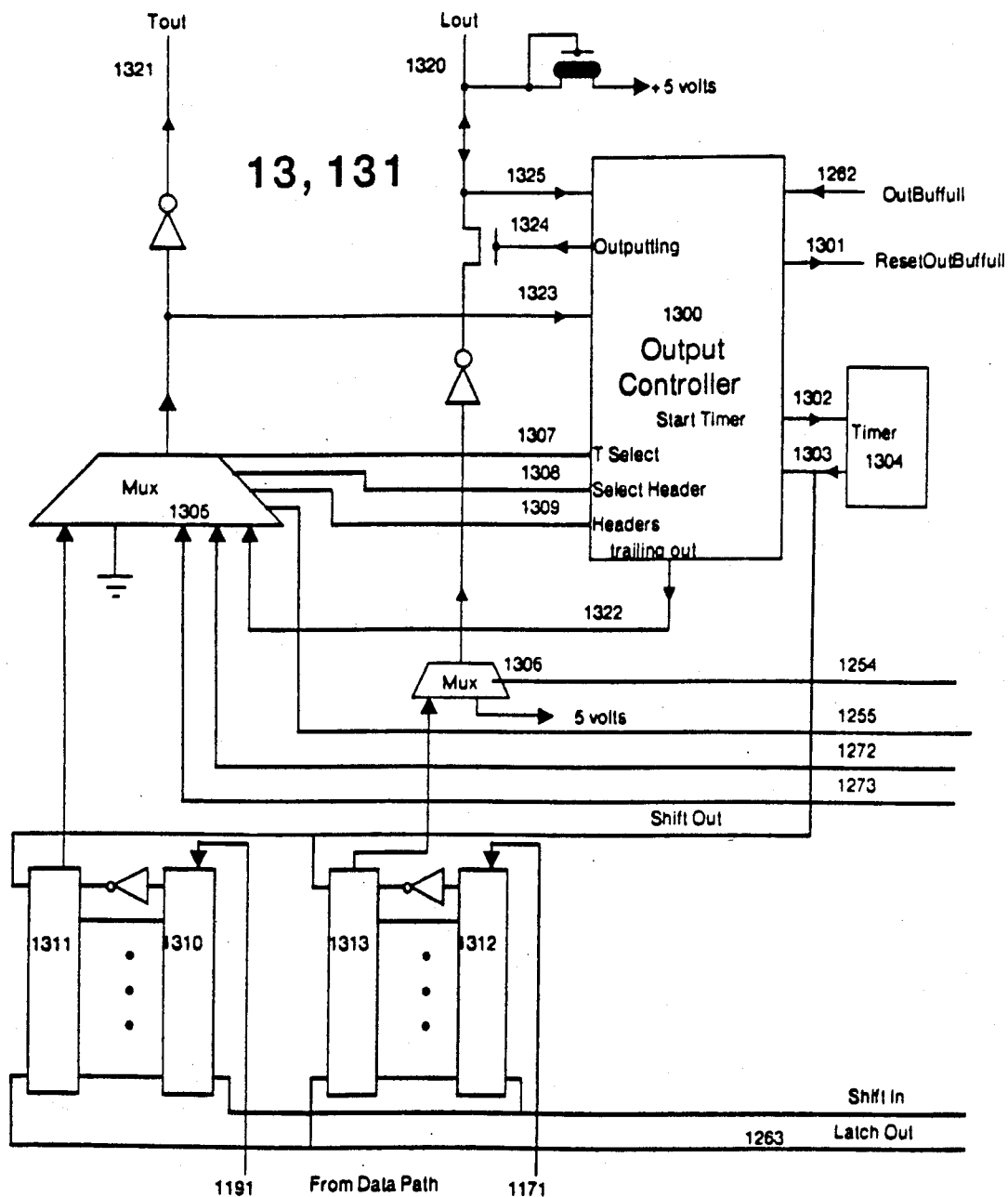
Figure 14: PC Output controller and Buffers

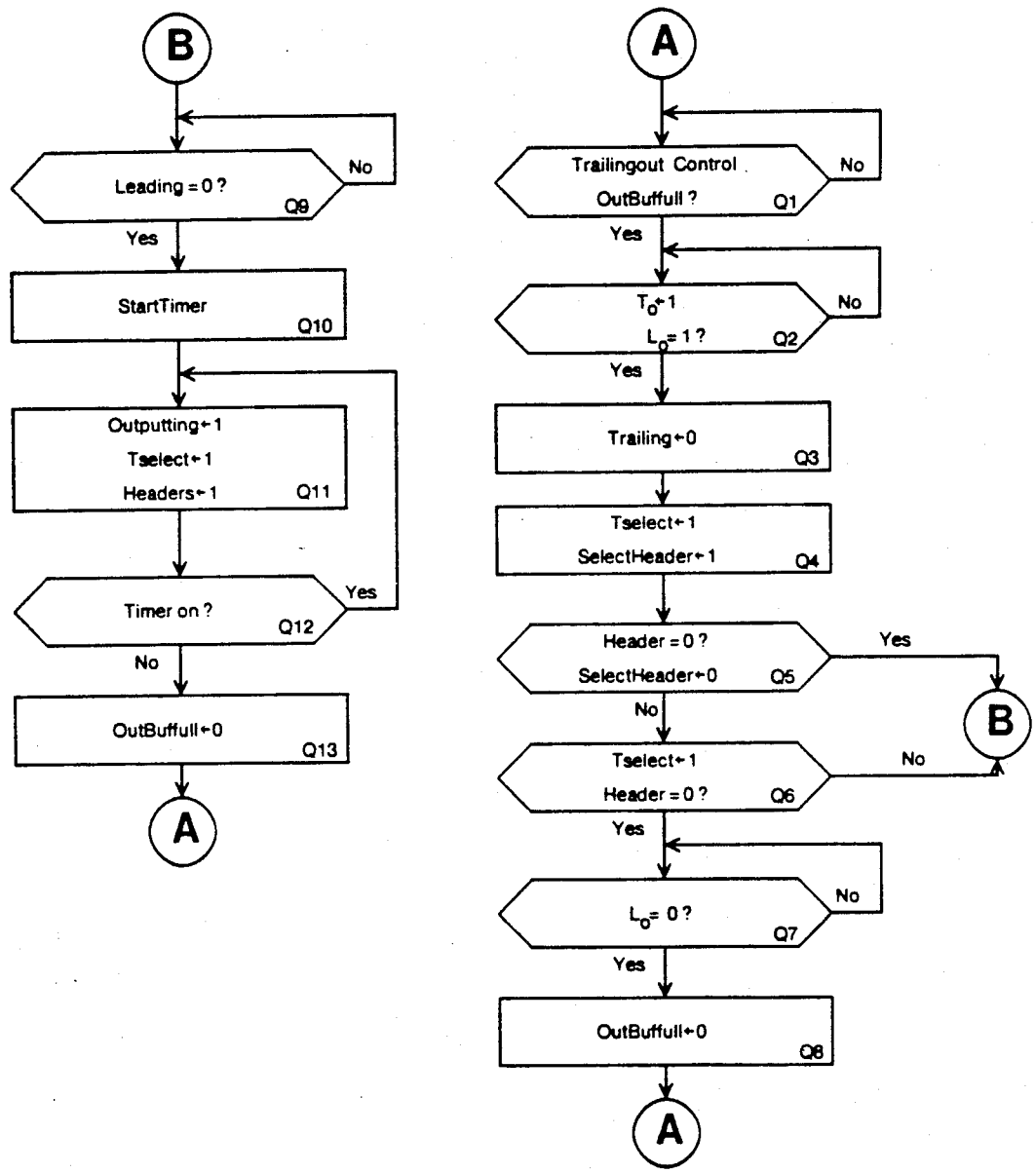
Figure 15: Flow Diagram for the PC Output controller

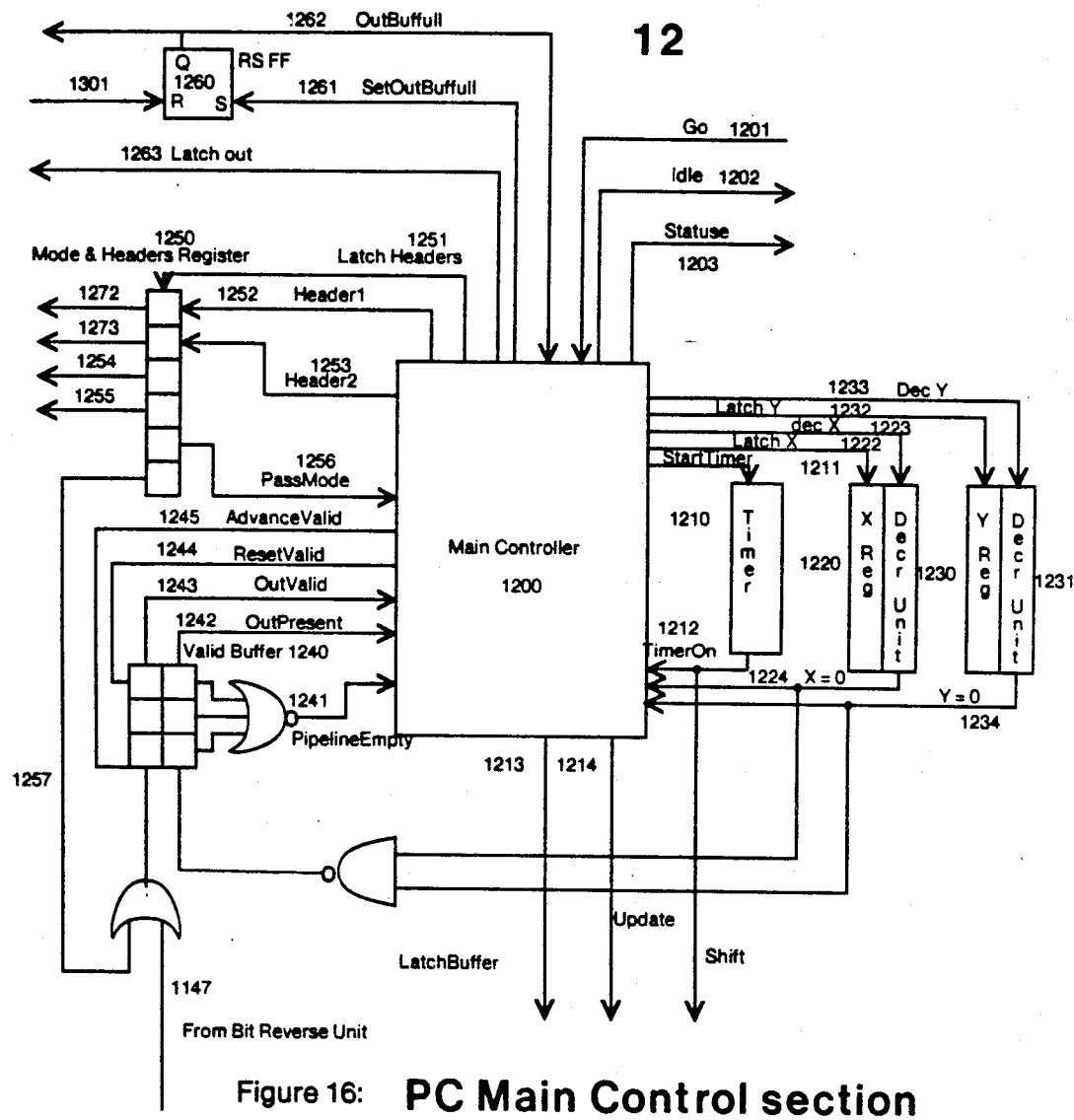
Figure 16: PC Main Control section

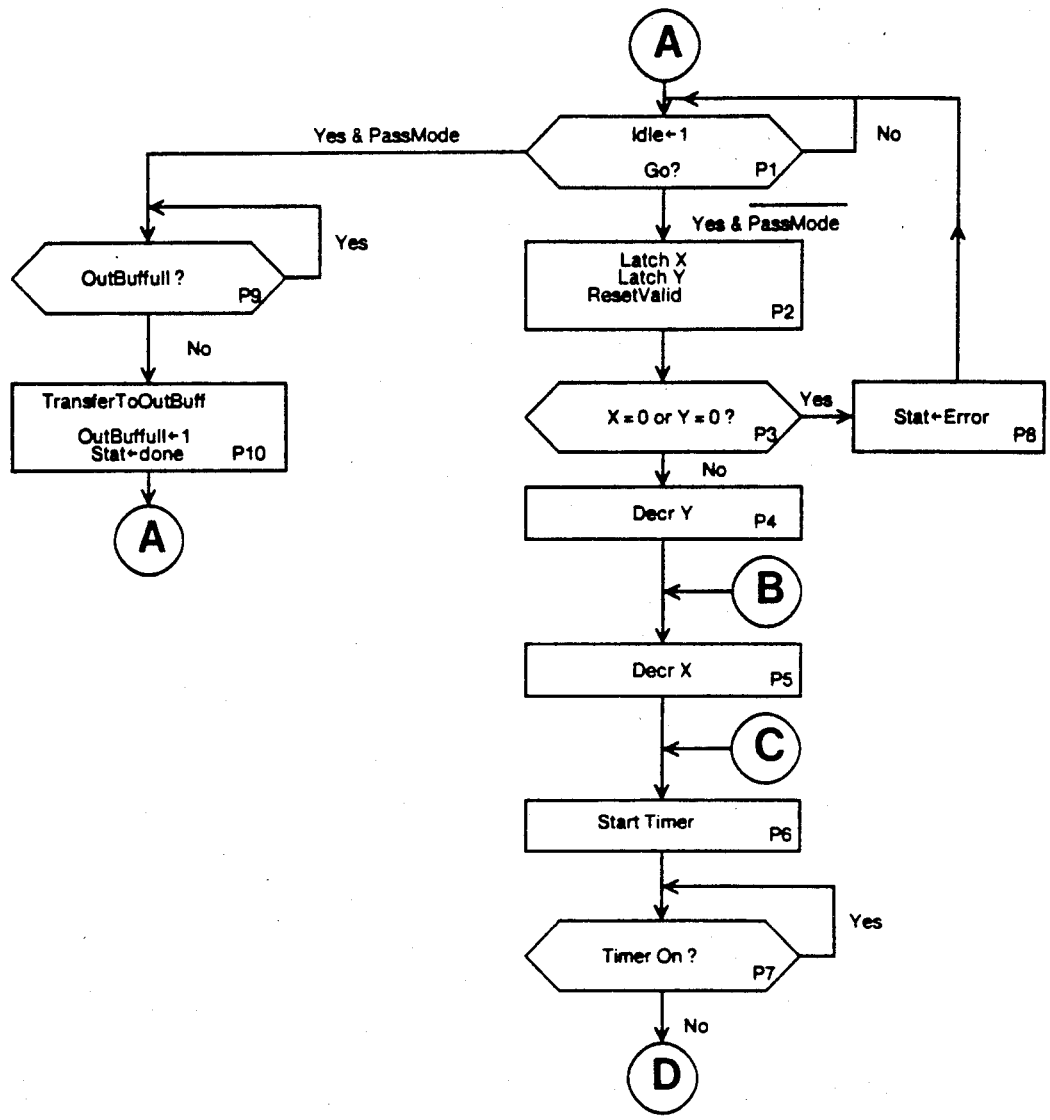
Figure 17A: Flow Diagram for the PC Main Controller

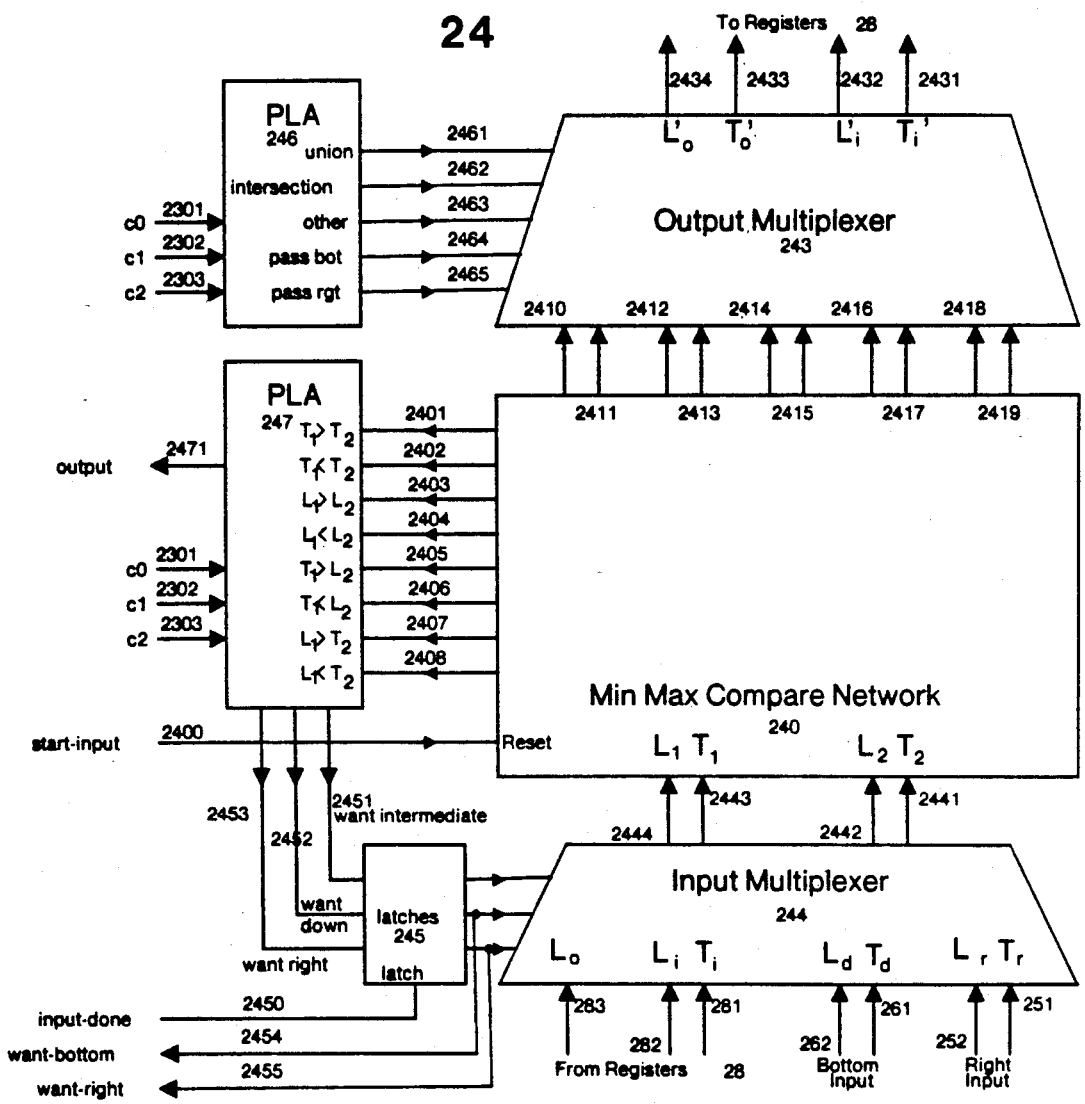
Figure 18: Combine Processor Data Path

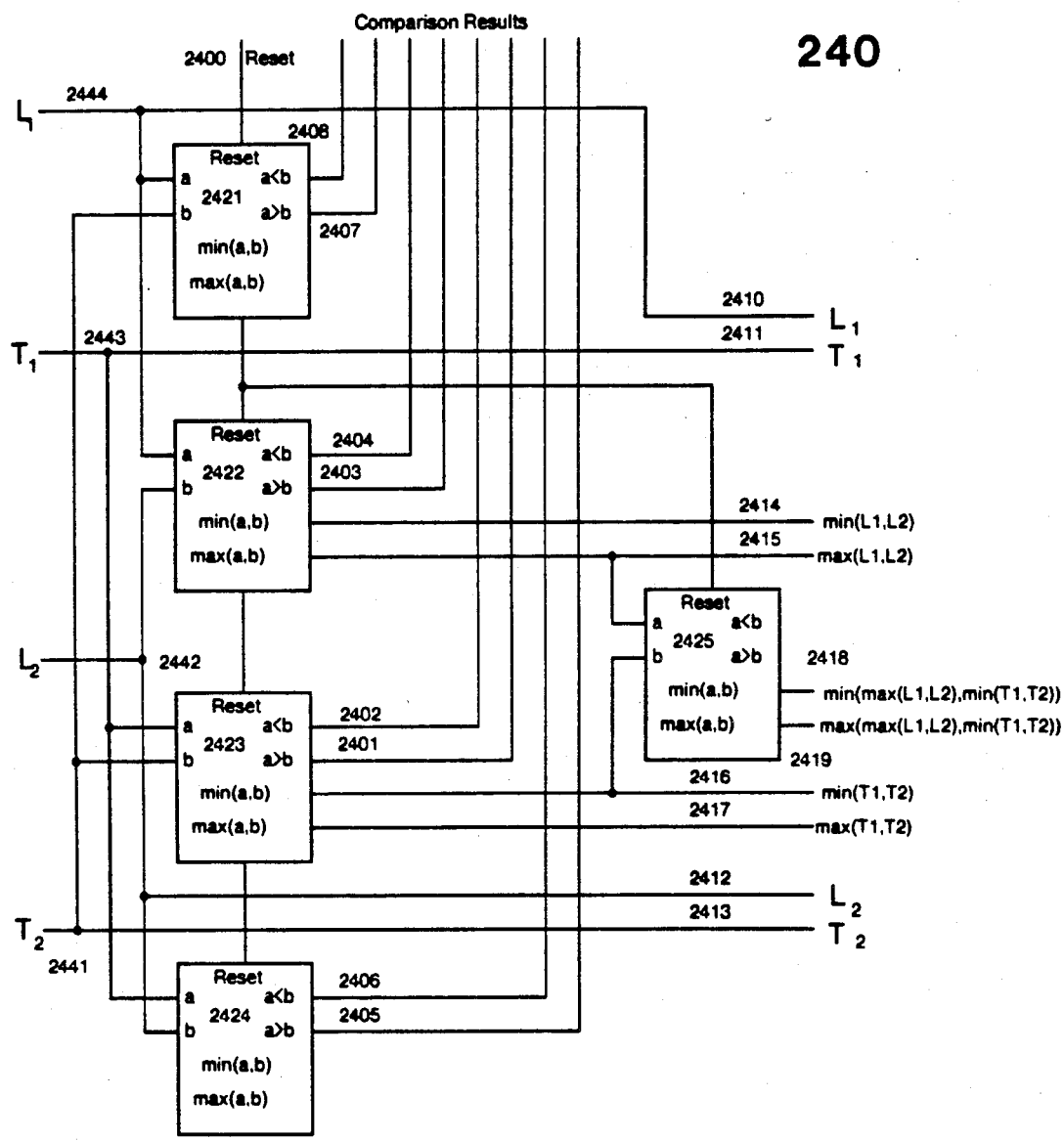
Figure 19: The MIN-MAX network

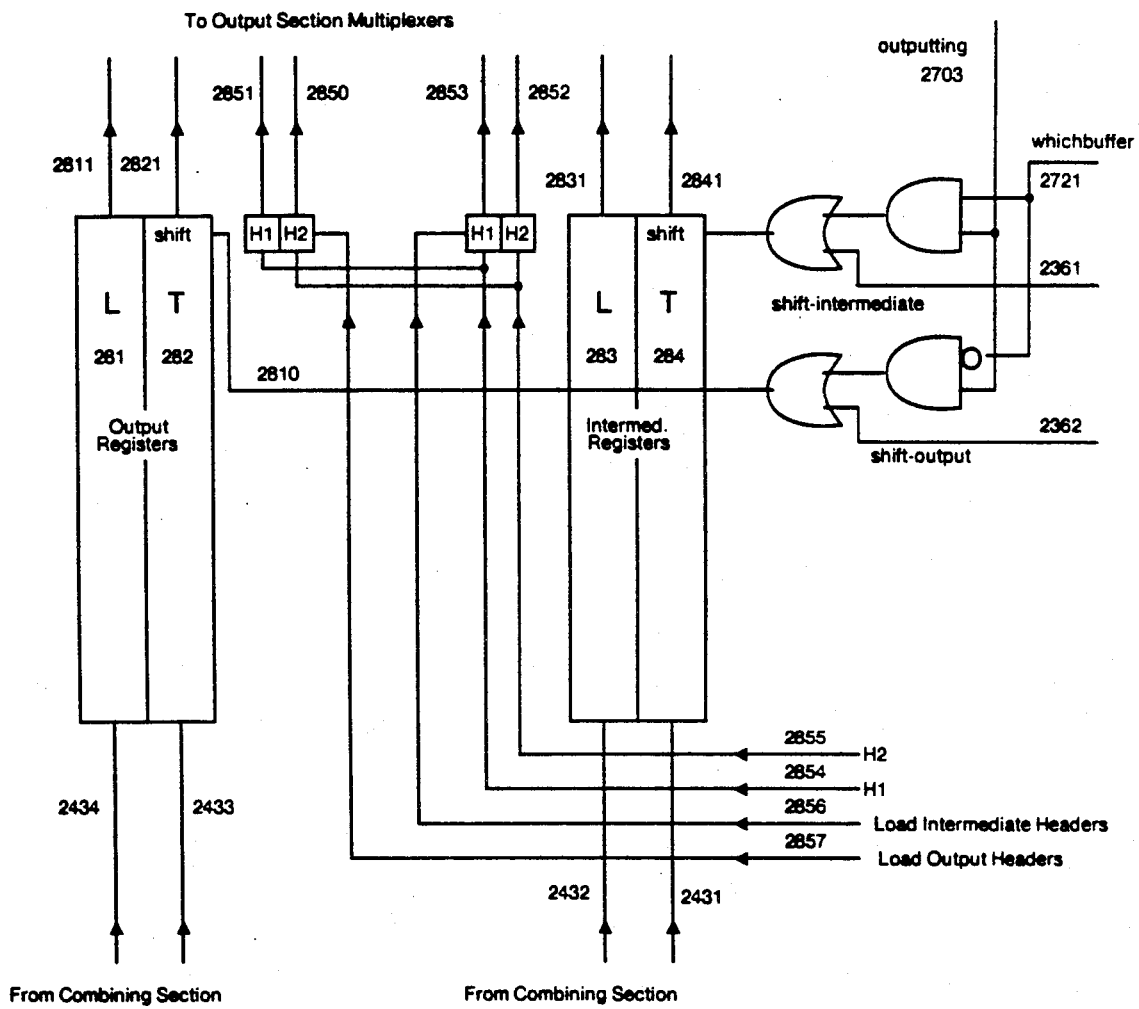
Figure 20: The Combine Registers

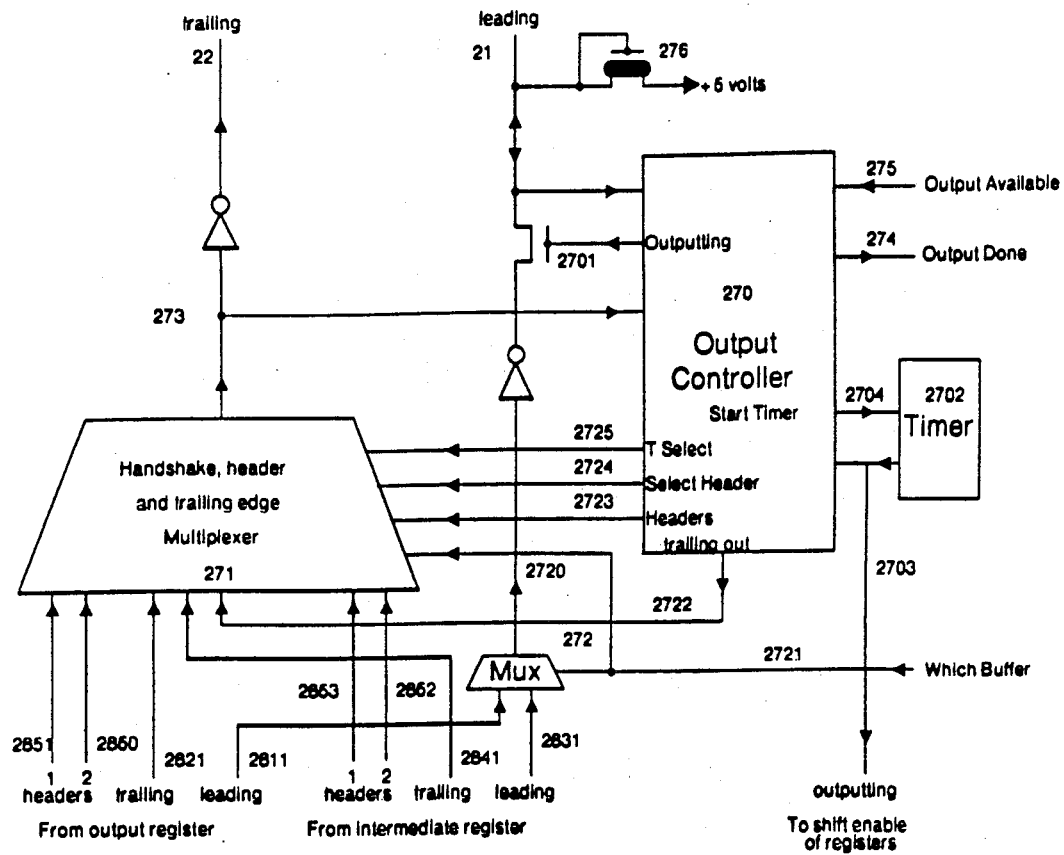
Figure 21: Combine Output Section

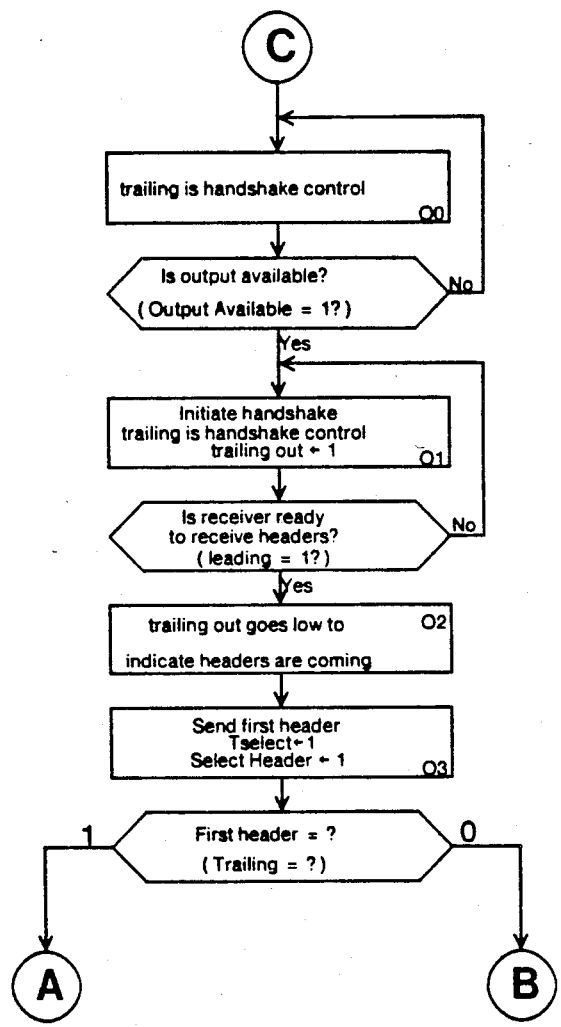
Figure 22A: Flow Diagram for the CC Output Controller

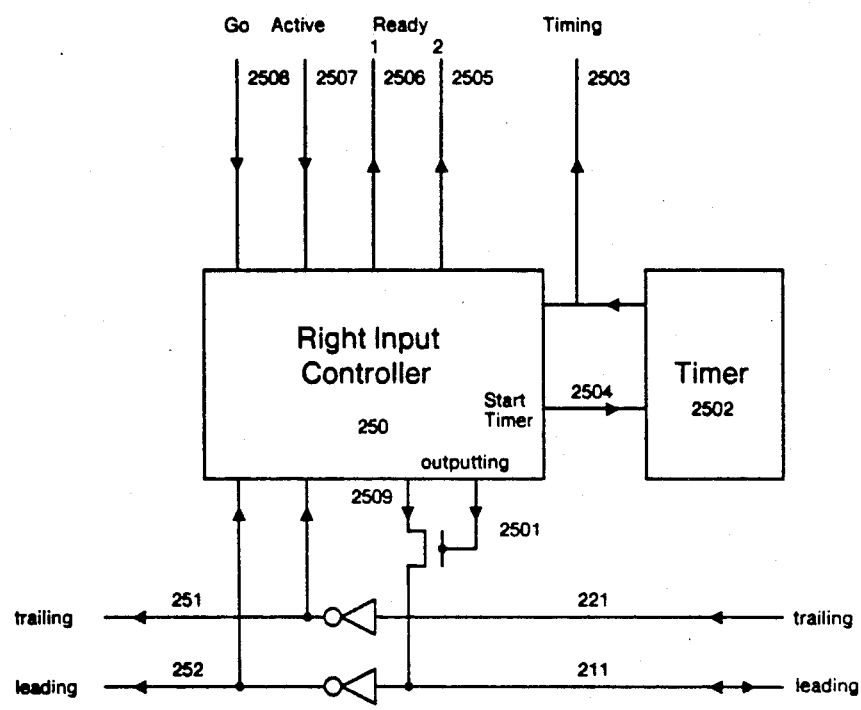
Figure 23: CC Right Input section

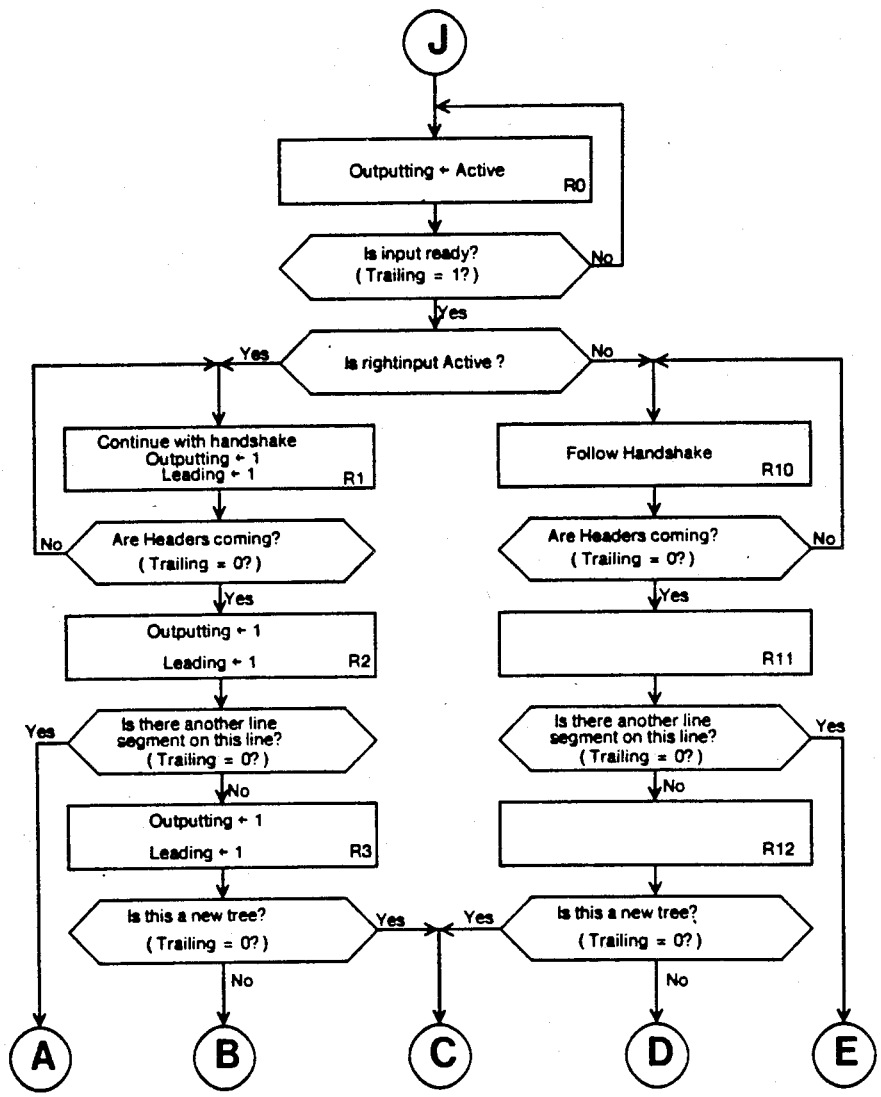
Figure 24: Flow Diagram for the CC Right Input Controller

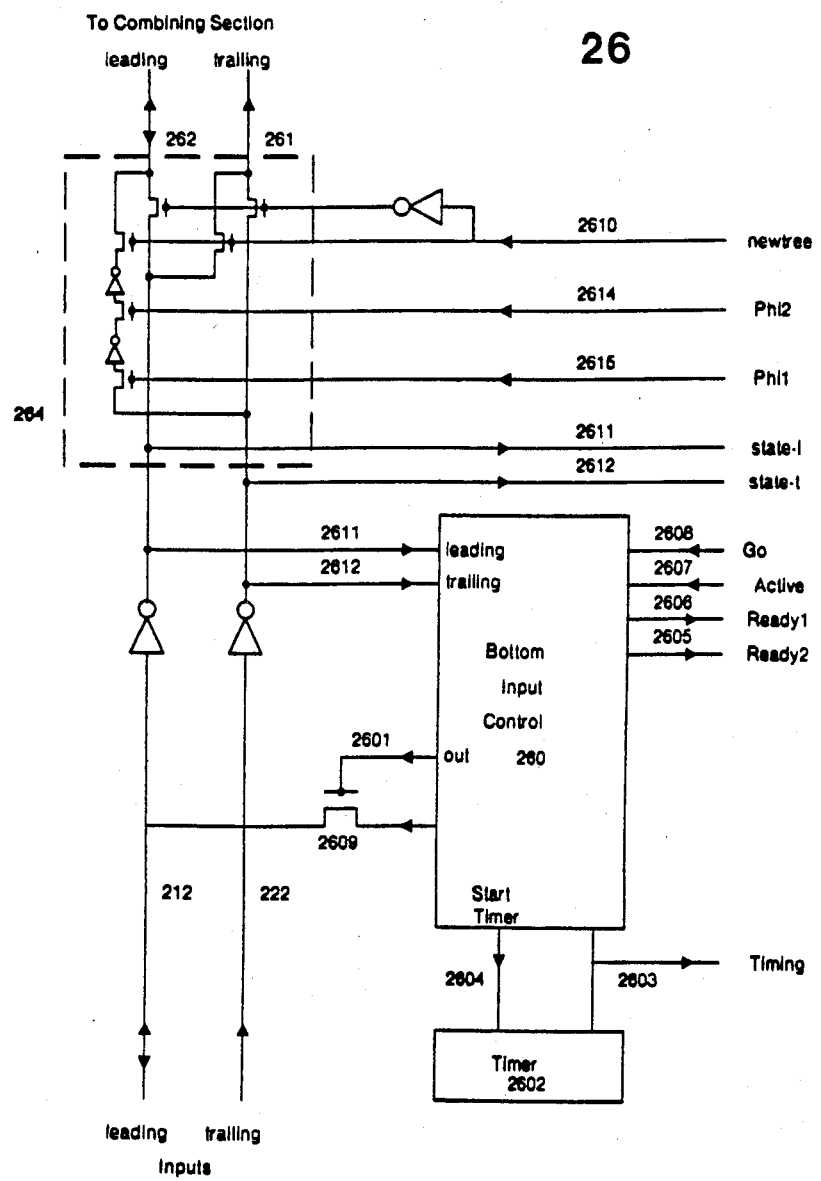
Figure 25: Bottom Input Section

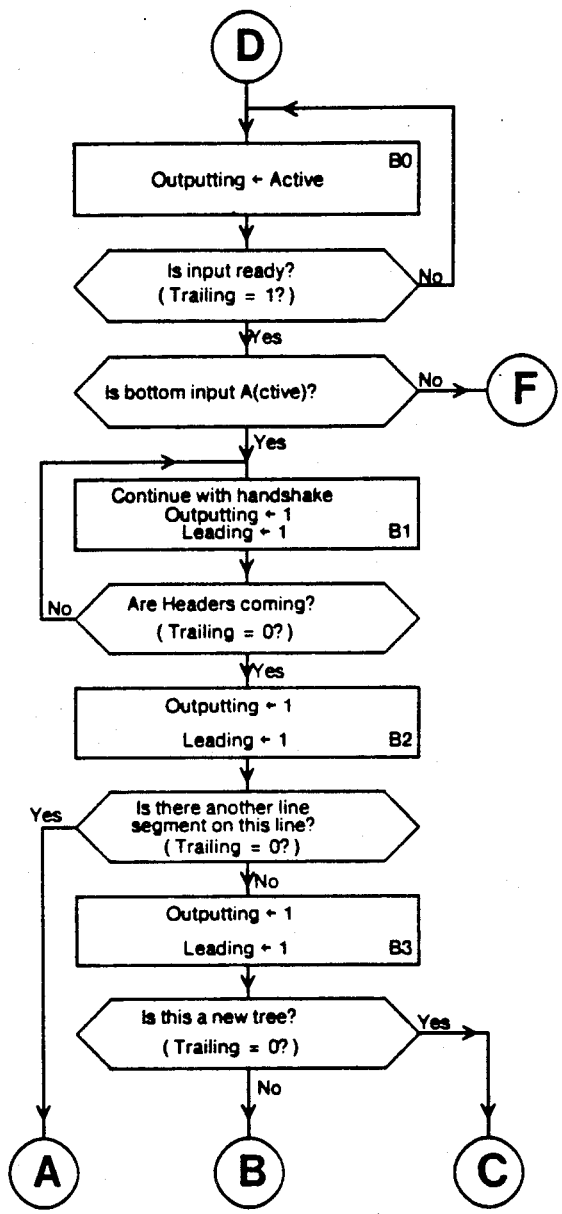
Figure 26A: Flow Diagram of Bottom Input Controller

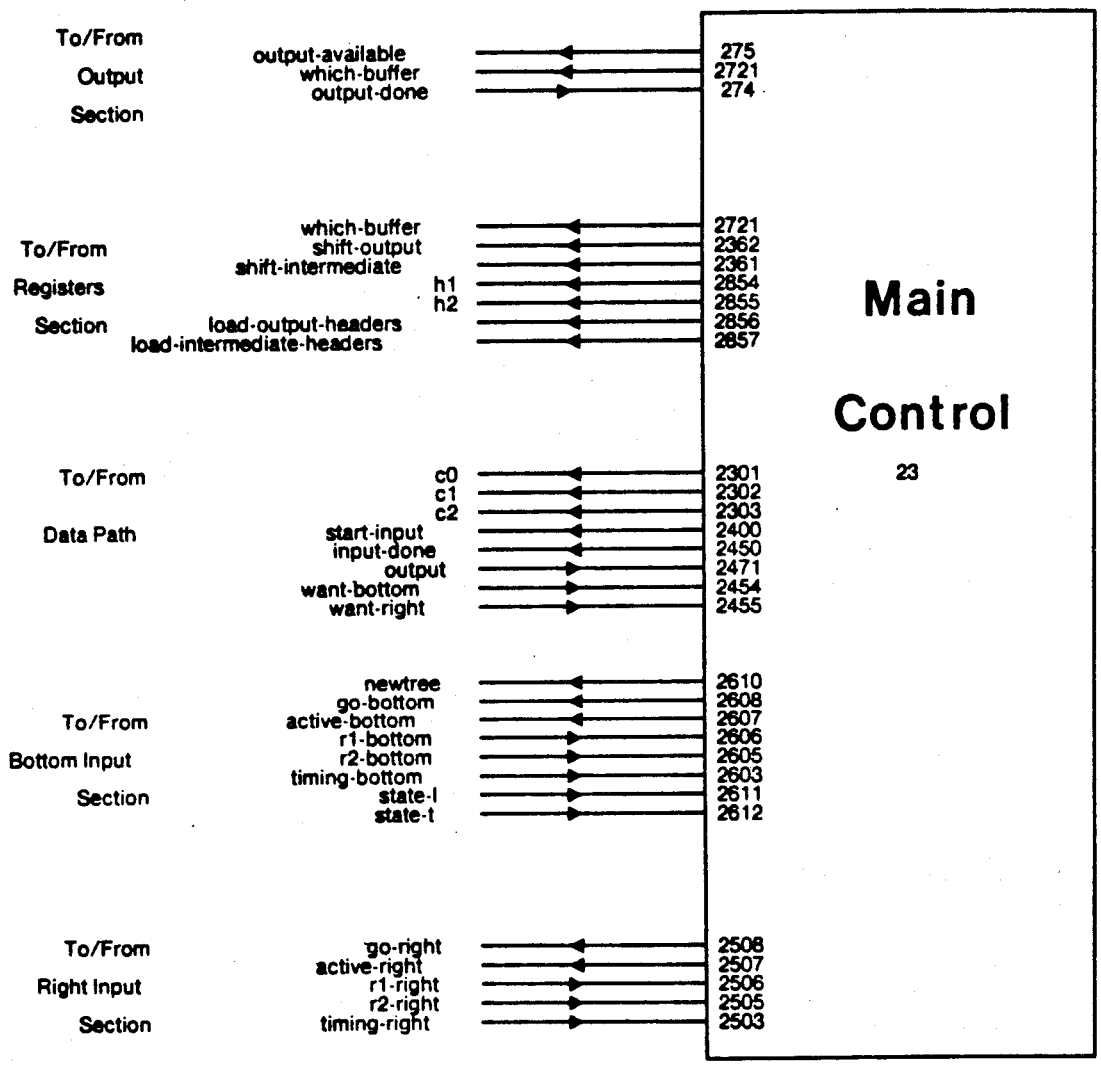
Figure 27: The CC Main Controller

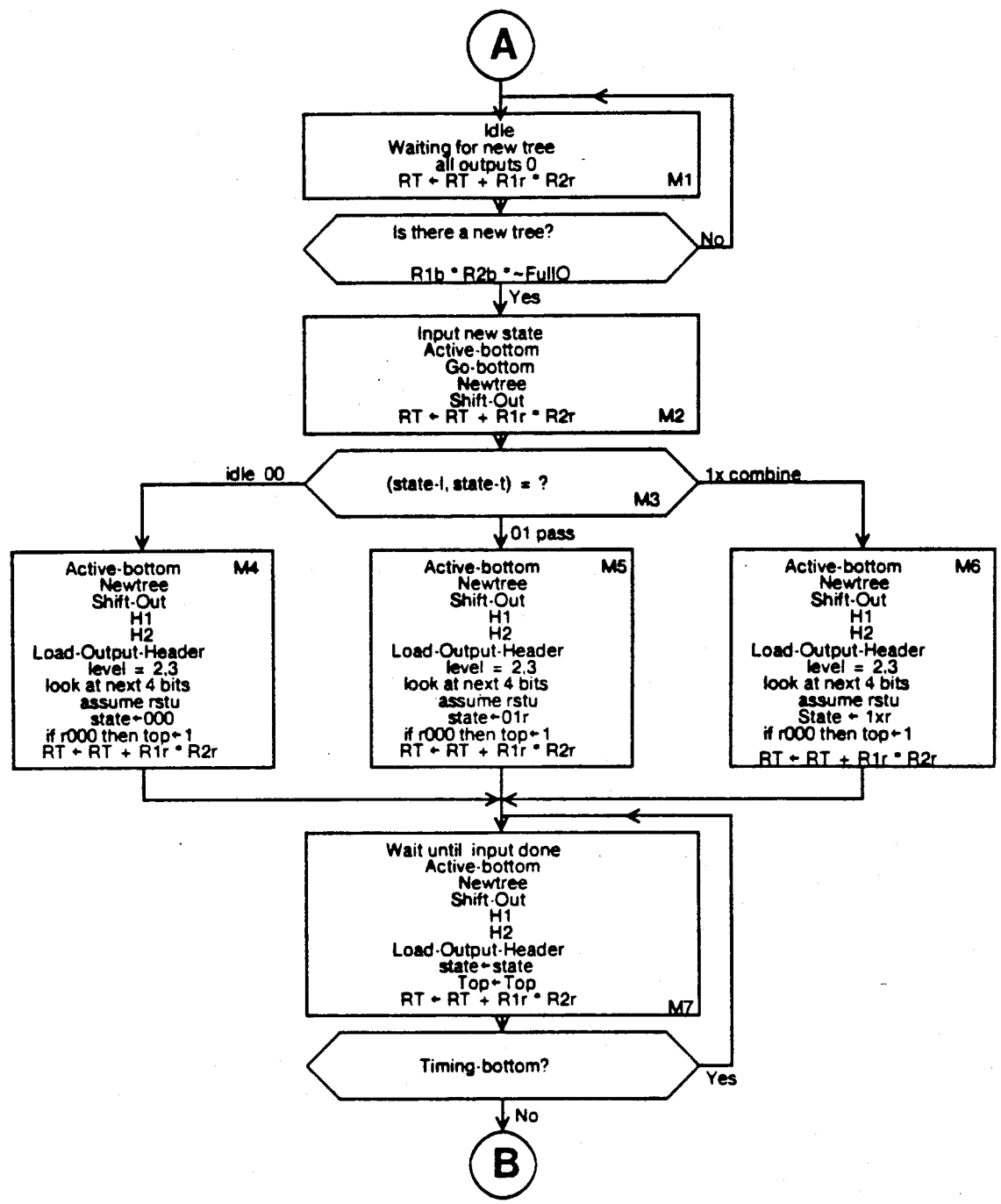
Figure 28A: Flow diagram for CC Main Control

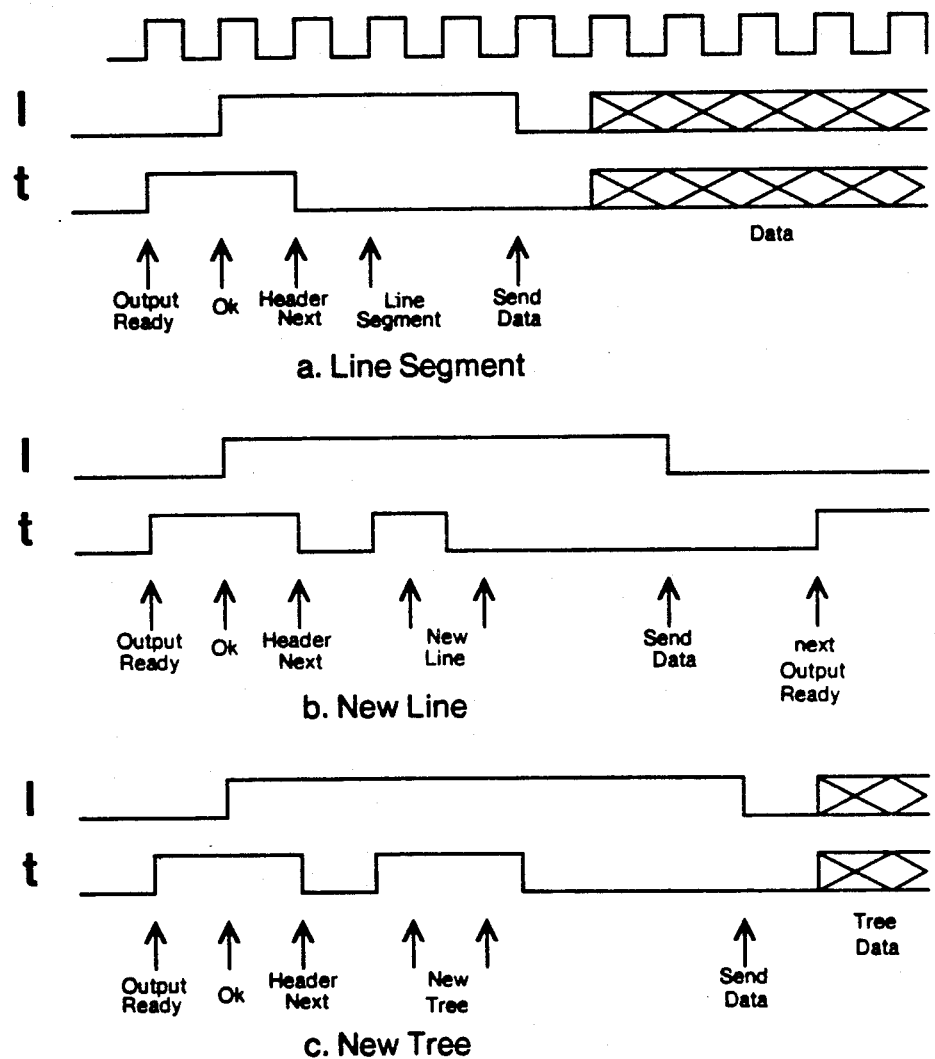
Figure 29: Comunication Protocol

COMPUTER SYSTEMS FOR CURVE-SOLID CLASSIFICATION AND SOLID MODELING

DESCRIPTION

The present invention relates to computer systems for characterizing plural dimensional objects, including providing image representations of such plural (two- or three-) dimensional objects by solid modeling and particularly to the processor for such systems which computes the intersections of curves with solid objects for generating data from which such representations can be provided.

The invention is useful in the generation of images of solids on a cathode ray tube (CRT) or a graphic hard copy read-out device (printer or other graphic display) for computer-aided design, computer assisted manufacturing (CAD/CAM) applications. It may be used for robot and machine tool simulation in order to program a robot for use in a working area without collision and interferences. It may also be used in the generation of character fonts with high resolution by characterizing each letter in the font as a tree of two-dimensional objects (circles, squares, triangles, etc.). The invention may also find application wherever displays, mass properties of solids, boundary evaluation, interference detection or other interactions of two- or three-dimensional objects with their environment are needed.

BACKGROUND OF THE INVENTION

CAD/CAM systems require means to store and manipulate computer representations of two- and three-dimensional objects. Moreover, there is a need to display these objects rapidly, compute their mass properties (such as volume and moments of inertia), compute if two objects interfere and so forth. One popular method for representing two- and three-dimensional objects is by means of constructive solid geometry (CSG).

To represent a solid, one uses regular set operations, union, intersection and difference, on a set of primitive solids oriented in space. The primitive solids are simple objects like blocks, balls, cones, cylinders and tori. The set operations are union, intersection and difference. Internally, an object is represented as a binary tree. The leaves of the tree are the primitive objects and the internal nodes are the set operations. FIG. 1A illustrates a three-dimensional object (bracket with a hole) and a CSG representation of that object. A more complete description of CSG solid representation can be found in A. A. G. Requicha & H. B. Voelcker, *IEEE Computer Graphics and Applications*, Vol. 2, No. 2, March 1982, 9-24; R. B. Tiolve & A. A. G. Requicha, *Computer Aided Design*, Vol. 12, No. 5, September 1980, 219-220.

One technique for generating shaded displays of three-dimensional objects or computing the volume of three-dimensional objects is to use ray casting, see S. D. Roth, *Computer Graphics and Image Proc.*, 18, (1982) 109-144. In ray casting one computes the intersection of a family of straight lines with the three-dimensional object. Using the endpoints of the intersecting intervals, one can compute the boundary of the object. Integrating along the intervals one can compute the volume and moments of inertia of the object. Any means for computing the intersection of a large family of lines with an object represented by a CSG representation is computationally very intensive therefore time consuming.

SUMMARY OF THE INVENTION

The object of this invention is to provide an improved computer system that will compute the intersection of lines (and other curves) with two- and three-dimensional solids represented as CSG trees. A processor of the system computes these intersections in parallel at much higher speed than is possible with a general purpose computer. A general purpose host computer is attached, in an embodiment of the system, via two interface units, to the processor. The general purpose host computer loads the processor with data and instructions for a given computation and receives the results of the computations for further processing.

The foregoing and other objects, features and advantages of the invention will become more apparent from a reading of the following description of a presently preferred embodiment thereof in connection with the accompanying drawings, each figure of which is labeled with a discriptive title.

BRIEF DESCRIPTION OF THE FIGURES

FIG. 1 shows a solid in FIG. 1A, a CSG representation for the solid in FIG. 1B, and in a FIG. 1C a general system configuration for computing curve-solid classification in accordance with the invention.

FIG. 3 is a diagram which illustrates the ray casting technique.

FIG. 4 is a block diagram of a portion of the system in accordance with an embodiment of the invention.

FIG. 6 is a block diagram which schematically illustrates the system in accordance with an embodiment of the invention.

FIG. 7 is a block diagram of a primitive classifier processor.

FIG. 8 is a block diagram of a combine processor.

FIG. 9 is a functional block diagram which shows the data path unit of FIG. 7.

FIG. 10 is a functional block diagram which shows the quadratic polynomial evaluation unit.

FIG. 11 is a functional block diagram which shows the bit reversal unit.

FIG. 12 is a functional block diagram which illustrates the bit serial square-root unit.

FIG. 13 is a functional block diagram which shows the linear polynomial evaluation unit.

FIG. 14 is a functional block diagram which shows the output section and buffers of the primitive classifier (PC) processor of FIG. 7.

FIG. 15 is the flow diagram of the PC output controller.

FIG. 16 is a block diagram which shows the PC's main control section.

FIG. 18 is a block diagram which shows the combining section of the combine processor (CC) shown in FIG. 8, which also shows the CC data path.

FIG. 19 shows the min-max network of FIG. 18.

FIG. 20 is a more detailed block diagram which shows the CC registers of FIG. 8.

FIG. 21 is a more detailed block diagram which shows the CC output section.

FIG. 23 is a more detailed block diagram which shows the right input control section of FIG. 8.

FIG. 25 is a more detailed block diagram which shows the bottom input control section of FIG. 8.

FIG. 27 is a block diagram which shows the CC main control unit of FIG. 8.

FIG. 29 shows three groups (a, b, c) of timing diagrams which show the communication "hand-shake" protocol used by the CC.

GENERAL DETAILED DESCRIPTION

In CSG representation, each complex solid is represented as a binary tree. The leaves of the binary tree are the primitive solids oriented in space. The internal nodes of the tree are the set operations—union, intersection or difference—that define how to combine the primitive solids in order to define the complex three-dimensional solid. FIG. 1A gives a simple example of a three-dimensional object and FIG. 1B a CSG representation. The object is made by taking the union of two blocks A and B and subtracting a cylinder C.

In order to compute the intersection of a line with a composite CSG solid, first the intersection of the line with each primitive solid is computed (See FIG. 3). The line is represented as a one-parameter family of points $P(t)=(x+at, y+bt, z+ct)$. Computing the line segments that are inside the primitive solid is equivalent to finding the interval segment of the parameter t for which the line is inside the solid. This gives rise to a set of inequalities for the parameter t. Solving these equations yields the interval of intersection.

Figure 2A:
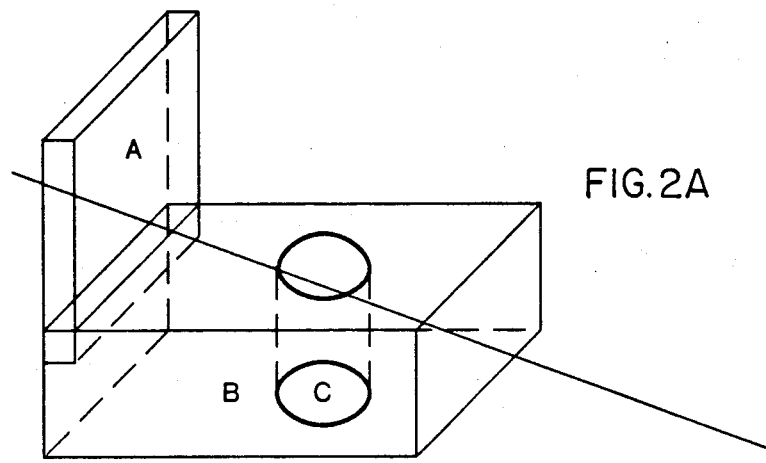
FIG. 2 illustrates the computation needed for curve-solid classification with FIG. 2A showing the solid and an intersecting line and FIG. 2B showing a table of the interval segments and computations thereon and also showing graphical representations of the computations.
Figure 2B:
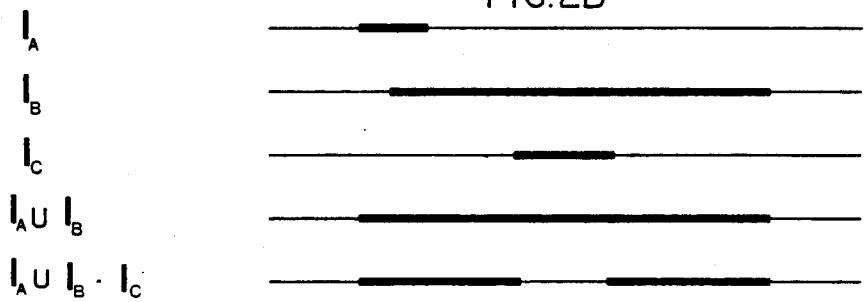

Once the intersection of the line with each primitive solid is known, one must compute the set operations defined by the CSG tree (FIG. 1B) on the line segments in order to compute the line intersections with the composite object. The results of the classification against primitive solids are propagated up the CSG tree. At each node 12 and 14 of the tree, the set operation on the results coming out of the two son or children nodes 16, 18 and 20, 22 is computed. FIG. 2 illustrates the computation needed for line-solid classification. First the intersection of the line with each primitive solid $I_A$, $I_B$ and $I_C$ is computed. FIG. 2A is a representation of the solid shown in FIG. 1A and the line. FIG. 2B is a table of the symbols for interval segments and their computation. The graphical representation of the interval segments are shown next to their respective symbols. This yields three interval segments for the line parameter t. Then $I_A \cup I_B$ is computed and finally $(I_A \cup I_B) \cap (\text{or } -) I_C$ gives the result.

In accordance with the invention (see FIG. 1C), all the line-primitive intersections are computed in parallel in the primitive classification processors (PC). The classification combiners (CC) or combine processors are connected into a binary tree that duplicates the binary tree defining the CSG solid. Each combine processor (CC) that corresponds to an internal node in the CSG tree computes the set operation that resides in that node. It receives from its children nodes a list of interval segments and it computes the set operation to produce a new list of interval segments. That new line segment list is sent to the processor parent (another CC). The parent processor receives two sets of intervals from its children, computes its set operation on the sets, and sends the result to its parent. The final results comes out of the root processor (the top CC in FIG. 1C). Thus, the system as shown in FIG. 1C operates as a classification machine.

The primitive classifier task is to compute the intersection of a given curve with a given primitive. The computation to be done depends on the kind of primitive solid and the curve that one wishes to classify. If the curves are polynomials or piecewise polynomial curves and the primitives are blocks, balls, cones, cylinders and tori, then the computation consists of multiplications and additions to compute polynomial equations. The roots of the polynomials are the end points of the intersecting curves. Generally, the roots are computed using a general root finding procedure.

While it is possible to construct a general curve-primitive classifier using a microprocessor and programming it to do the classification, the classification done this way will not be fast enough to keep up with the combine processors. Incremental classification is preferred, since it can be done at very high speed.

In order to explain incremental classification, we will make the following simplifications:

(1) The classification is only with straight lines.
(2) The primitives are linear and quadratic half spaces (surfaces which define the primitives), that is: all the primitives can be described by the inequality:

$$kX^2 + lY^2 + mZ^2 + mXY + oXZ + pYZ + qX + rY + uZ + v \leq 0$$

with appropriate coefficients k, l, ..., v. In practice, this restriction only eliminates the torus from the usual list of primitives.

An array of parallel lines with the primitive solid is classified, not just an individual line, because of the parallel processing in the PC's. A small part of the computation is done only once for the whole array as a preprocessing step. This step is preferably done outside the classification machine by a general purpose host computer, as will be described in greater detail in connection with FIG. 7. Once the preprocessing step is done, the amount of computation to classify each line in the array is small. To classify each line against a quadratic half-space, a second order equation is computed and solved. (See explanation below.) In order to reduce the amount of computation needed, instead of first computing the equation and then solving it for each line separately, a recurrence relation is derived that enables an equation to be computed and solved using only four additions, one subtraction and one square-root operation per line.

As a preprocessing step, the host computer computes the coefficients of the recurrence relations. This computation, however, is done only once for the whole array of lines. The primitive classifier, PC, is loaded with the recurrance coefficients and the array size. Using these coefficients, the PC needs to compute only six arithmetic operations in order to classify each line.

Incremental classification of a family of lines is carried out as follows: One constructs a two-parameter family of straight lines P(h,t). For each fixed value of h, say $h_0$, P($h_0$,t) is a straight line. By varying h, one can construct a collection of lines. If $P(h,t)=(x_0+a_0t+a_1h, y_0+b_0t+b_1h, z_0+c_0t+c_1h)$, then we have a set of parallel lines.

In order to classify the line against a primitive half space, say a unit cylinder:

$$x^2 + y^2 - 1 = 0, \text{ one has to solve} \quad (1)$$

$$(a_0t + a_1h + x_0)^2 + (b_0t + b_1h + y_0)^2 - 1 = 0$$

or $$A(h)t^2 + B(h)t + C(h) = 0$$

where A(h), B(h), C(h) are polynomials in the parameter h. For all quadratic half spaces (balls, cones, cylinders, and so on) the following is true:

(1) A(h) is independent of h; that is, A(h) is identically constant.

(2) B(h) is a polynomial of degree one in h.

(3) C(h) is a polynomial of degree two in h.

The solutions of equation (1) are $t_{1,2}=B/2A\pm\sqrt{(B/2A)^2-C/A}$.

The discriminant $D=(B/2A)^2-C/A$ is a second degree polynomial in h. To compute $t_{1,2}(h)$, one needs to compute the values of two polynomials B(h)/2A and D(h), for a given value of h.

It is well known that if one needs to compute the value of an Nth degree polynomial over a set of equally spaced points, one can use a difference table to compute the polynomial values using only N additions per value. For example, Let $h_i=h_0+i\cdot\Delta h$ and let P(h) be a second degree polynomial. Define: $P_i=P(h_i)$, $\Delta P_i=P_i-P_{i-1}$ and $\Delta^2 P_i = \Delta P_{i+1}-\Delta P_i$. Then (a) $\Delta^2 P_i$ is a constant independent of i     (2.a)

(b) $\Delta P_{i+1}=\Delta P_i+\Delta^2 P_i$     (2.b)

(c) $P_{i+1}=P_i+\Delta P_{i+1}$     (2.c)

So if $P_0$, $\Delta P_0$ and $\Delta^2 P_0$ are known, then $P_i, i=1, 2, \ldots$ could be computed using the recurrence relations 2.b and 2.c with only two additions per point. Therefore, D($h_i$) can be evaluated using two additions per point and B($h_i$)/2A can be computed using only one addition per point. Therefore, the set of parallel lines $P(h_i,t)i=0, 1, 2, \ldots$ can be classified against any quadratic half space using four additions, one subtraction and one square root operation per line.

The incremental algorithms for classifying parallel lines can be extended to work on a regular lattice of parallel lines, not only lines that lie in a single plane. Let P(s,h;t) be defined as:

$$P(s,h;t)=(x_0+a_0t+a_1h+a_2s, y_0+b_0t+b_1h+b_2s, z_0+c_0t+c_1h+c_2s).$$

and $P_{ij}(t)=P(s_i, h_j; t)$ where $s_i=s_0+i\Delta s$, $i=0, 1, 2, \ldots$, and $h_j=h_0+j\Delta h$, $j=0, 1, 2, \ldots$.

The collection of lines $P_{ij}(t)$ form a regular lattice of parallel lines in space. For a fixed i, $P_{ij}(t)$, $j=0, \ldots N$, are classified by the incremental algorithm described above. To start the computation for the next index i, another incremental computation can be done. The discriminant $D(h)=(B(h)/2A)^2-C(h)/A$ is a second degree polynomial in h where the coefficients are functions of s.

$$D(h)=\alpha(s)h^2+\beta(s)h+\gamma(s).$$

$\alpha(s)$ is identically constant, $\beta(s)$ is a polynomial of degree one in s, and $\gamma(s)$ is a polynomial of degree two. Now, in order to be able to compute the values of the polynomial D($s_{i+1}$; $h_j$) $j=0, 1, 2, \ldots$, one needs the zero, first and second differences of the polynomial D($s_{i+1}$, h) at $h_0$. The second difference is constant since $\alpha(s)$ is identically constant. The first difference as a function of s is a first degree polynomial and therefore can be computed incrementally from the previous first difference by one addition. The zero order difference, that is, the value of D(s,h), is a second degree polynomial in s. Therefore the value of D($s_{i+1}$; $h_0$) can be computed from the difference table of D(s,$h_0$) using only two additions per row of lines.

Therefore, in order to compute the coefficients of the difference table for D($s_{i+1}$;h) at $h_0$ from the difference table of D($s_i$;h) at $h_0$ one needs three additions. Similarly, one addition will be necessary for computing the difference table of D($s_{i+1}$;h) from the table for B($s_i$;h).

In conclusion, we have shown that four additions, one subtraction and one square root per line are needed for incrementally computing parallel line classification against any quadratic half spaces. Four additions are needed to update the incremental computation coefficients when going from one row of lines to the next.

The combine processors CC are connected so they can classify curves against any CSG solid. The binary trees representing CSG solids, of course, can vary and have no regular form. It is not useful to connect the combine processors as a fixed binary tree, since it is impossible to tell a priori what kind of a binary tree the CSG tree will be. Unfortunately, it is impossible (in general) to balance the CSG tree. A tree structure is selected that will enable one to embed any binary tree in it. In particular, we have found that any right-heavy binary tree could be imbedded in a ($\log_2$ (N)+1)$\times$N array.

A binary tree is right-heavy if the number of nodes in each right subtree is greater or equal to the number of nodes in the corresponding left subtree. A binary tree can be made to be right heavy by interchanging some of its left and right subtrees.

A right-heavy binary tree with N leaves can be imbedded into a ($\log_2$ (N)+1)$\times$N array as follows: The root is in the upper left corner. The leaves are at the bottom row. Left links of the tree are downward links in the array and right links in the tree are right links in the array. The tree is imbedded by traversing the tree in preorder. If a leaf was encountered before the bottom of the grid was reached, the last link is extended to the bottom. Each right link is extended according to the following rule: Let K be the number of leaves that are before the current node (in prefix order). The right link is extended so that the node is in column K+1.

Figure 5B:
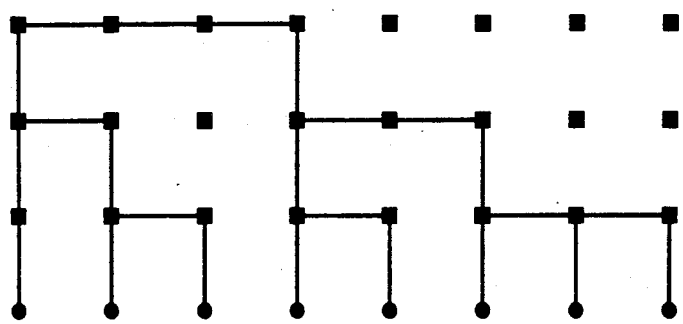
FIG. 5 are diagrams which illustrate the imbedding of a binary tree in a $(\log_2(N)+1) \times N$ array with FIG. 5A illustrating the tree and FIG. 5B the tree embedded in the array.
Figure 5A:
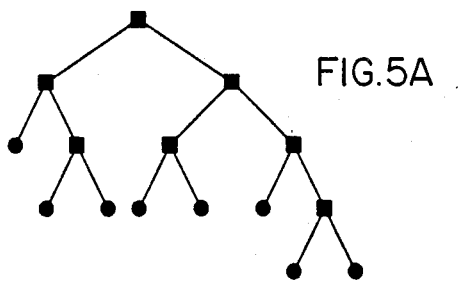

FIG. 5 illustrates a binary tree (FIG. 5A) and its imbedding into an array (FIG. 5B). The leaves of the tree are circles and the internal nodes are squares. The circles in the array show where the leaves of the tree will be and the square nodes show where the internal nodes of the tree could be. It is important to note the following points:

(1) All the leaves of the binary tree are at the bottom.

(2) Each processor in the array is connected to its four neighbors. However, in the tree imbedding, the right and left sons are the right and bottom neighbors respectively and the parent is either the top or the left neighbor. Therefore, each processor in the array has two input ports at the right and at the bottom. The output from each processor goes to its top and left neighbors.

(3) Some of the processors in the array function only as links. They are not used as the nodes of the binary tree. These processors only transfer the information unchanged from their inputs to their output.

Each classification combine processor receives two lists of interval segments. Each interval is represented by two fixed point numbers l and t where l is the leading edge of the interval and t is the trailing edge of the interval. The two lists come from the bottom and right neighbors. Each combine processor computes a set operation (union, intersection, difference) on the two lists of interval segments. The results from each combine processor are passed to it's left and top neighbors. FIG. 4 illustrates how the combine processors are interconnected.

Each processor in the interior of the array receives input from its right and bottom neighbors and sends its output to both his top and left neighbors. The bottom row of processors receive their right input from their neighbor and the bottom input from a PC. At the top row, each processor only communicates with its left neighbor, with the exception of the upper left corner CC, the root processor, that sends its output to the DMA interface unit.

FIG. 6 is the block diagram of the curve-solid classification, CSC, system provided in accordance with the invention. The "core" of the machine is a ($\log_2 (N)+1)\times N$ grid or array 2 of processors. The bottom row of the array is made of primitive classifiers 1 (PCs). Each PC is connected to a classification combine processor CC directly above it. The CCs are arranged as a $\log_2 (N)\times N$ array 2. The CC processor at the top left corner is always the root processor (see also FIG. 4) and is connected to a DMA unit 4 that interfaces with the array 2 and PCs 1, which operate as the CSC machine, to the host computer. The output of the CSC machine comes out only through the root CC. The task of the DMA unit is to transfer the output from the CSC machine into the host memory (the main memory 6).

All the PCs are connected by a local bus 5. Each PC has a register which is given a unique address and can be read or written to from the bus. An interface unit 3 connects the local bus to the host system bus thus enabling the host to read and write directly into the PCs registers.

The PCs are programmed by loading their registers. The host computer downloads each PC with the recurrence coefficients it needs. It also loads some additional information to the PC, namely, how many lines are at each row, how many rows there are, and in what mode of operation to work. The different modes of operations are explained below. The host computer can also load the CCs with instructions, but not directly. The instructions to the CCs are loaded into the output buffers of the PCs and are then loaded onto the CC array bit serially the same way the data from the PCs are loaded. Each CC instruction is 3-bits long. The instructions are packed into two 16-bit words (packet). The instructions are passed up the column from a CC to its top neighbor. Each CC strips the 3 bits of its instructions out of the coming word and rearranges the bits in such a way that the first bit of the next CC's instruction is the most significant bit in the "leading edge" word. (See also detailed description below). The instructions to the CCs are very simple. There are only 7 different instructions. The instructions tell each CC what its function is. The functions are: compute union; compute intersection; compute right input minus bottom input; compute bottom input minus right input; pass information from the right; pass information from the bottom; and no-op. In addition, there is a bit configuration that signals that no more instructions are in the packet. Each instruction is coded into 3 bits. All the instructions of a single column are packed into two 16-bit words. Since the two words are transmitted together, the instructions are packed as follows: The instruction for the bottom CC in the column is first, then comes the instruction of its top neighbor and so on. The bits of the instructions are alternately put in the first and second words starting with the most significant bit. Hence, the first bit of the first instruction is the most significant bit of the first word. The second bit of the instruction is the most significant bit of the second word, the third bit is the next bit of the first word, and so on.

The CSC machine is programmed by loading the PCs registers and by loading the CCs with instructions. The host computer 7 activates each PC by writing into its fixed instruction register. When activated, the PC starts to classify lines, one line at a time. The result of the classification is then passed to the CC directly above. The result of the classification is either an interval segment or a null interval (zero length segment). An interval is represented by two 16-bit numbers, the leading edge L and the trailing edge T. In order to communicate the two numbers to its parent, each processor first goes through a full hand shake sequence with the receiving processor. FIG. 29 illustrates the hand shake protocol. In addition, two bits of header information are passed to tell the receiving processor the nature of the coming information. The coming packet of information could be two 16-bit words of data, that is, an interval segment, or two 16-bit words of instructions, or an end of line signal (EOL). A null interval segment is represented by two EOL signals with no data in between, that is, no data is passed to represent a null interval.

The PC has several modes of operations: (1) Mode 1: (normal mode) In this mode, the two numbers coming out of the data path are taken to be the interval segment end points, L and T. (2) Mode 2: In this mode L is "$\infty$," that is, the largest 16-bit number (all bits=1), and T is taken out of the data path. (3) Mode 3: T is "$-\infty$," that is, the smallest integer (all bits=0). Note that the PC uses fixed point twos complement arithmetic but the CCs use scaled fixed point by adding $2^{16}$ to all the numbers. Therefore, 0 is the smallest number and 0177777 (base 8) is the largest. (4) Mode 4: In this mode the PC receives from the host the line classification data and passes it to the CC. (5) Mode 5: In this mode the PC receives from the host an instruction for the CC column and it passes it to the CC array unchanged.

The machine illustrated in FIG. 6 includes N primitive classification processors 1, an array of $\log_2(N)\times N$ combine processors 2 and two interface units 3 and 4. One of the interface units 3 is connected to all the primitive classification processors via the local system bus 5. This interface unit 3 is used to load data and instructions into the classification machine. The second is a DMA unit 4 that is connected to the top of the combine array 2 and is used to receive the results of the computation from the combine array and send the results to the host computer 7.

FIG. 7 illustrates the main building blocks of the PC. The PC is made of a data path 11, an output section that includes an output controller 13 and output buffers 131 and a main controller 12.

The actual computation is done in the data path 11 (see FIG. 9). The data path is a computational pipeline that has a quadratic evaluation unit (QEU) 112, a bit serial square-root unit 116, and a linear evaluation unit (LEU) 111. The QEU evaluates $d=(b/2a)^2-c/a$. The square root unit computes $\sqrt{d}$. The LEU computes $-b/2a$. At the end of the pipe, an adder 119 is used to compute $L=-b/2a+\sqrt{d}$ and a subtractor 117 to compute $T=-b/2a-\sqrt{d}$. The values of L and T are put into the output buffer. The output controller 13 communicates with the CC above it and controls the information transfer from the output buffer to the CC.

The main controller 12 controls the operations of the output controller 13 and counts the number of lines classified. It activates the data path, and it controls the update of the computation of the QEU and LEU registers and notifies the host computer 7 (FIG. 6) when the PC operation is complete.

FIG. 8 illustrates the main building blocks of which the combine processor is made. The combine processor is made up of a main controller or control unit 23, combine data path (the combining section 24), a set of four shift registers 24 (two intermediate registers and two output registers), two input controllers 25 and 26 and one output controller (output section 27). Each CC processor has four inputs; two 212 and 227, $L_b$ and $T_b$, are from its bottom neighbor. $L_b$ is the wire transmitting the leading edge (point of each interval segment coming from the bottom neighbor). $T_b$ transmits the trailing edge (point) of the intervals. Similarly, from the right neighbor inputs 211 and 221, $L_r$ and $T_r$ transmit the leading and training edges of each interval segment coming from the right. The output of the CC comes on two wires 210 and 200, $L_o$ and $T_o$; the leading and trailing edges of the interval segments coming out of the CC processor.

The main control unit 23 controls the data path computation, the shift registers 28 and the I/O controllers 25, 26 and 27. The main control unit 23 controls which set operation is being computed on the sequence of interval segments. It receives the state of each input controller 25 and 26, the state of the output controller 27 and the flags from the data path 25. Using this information, the main controller initiates I/O sequences and resets the comparison network units.

The combine data path (the combining section 24) is illustrated in FIG. 18. The task of the combine data path is to compute set operations on two lists of interval segments. The datapath is made of an input selector (multiplexer 244), min-max comparison network 240, a controlling programmable logic array (PLA 247), and an output selector (multiplexer 243) with its PLA 246.

The main controller 24 (FIG. 8) controls both the input and output MUXes 244 and 243 feeding the min-max network 240. By selection of inputs and outputs, all the possible set operations, union, intersection and difference, can be computed. In addition, input from the right or the bottom can be passed through the data path (the entire section 24) unchanged.

The bottom and the right controllers 25 and 26 (FIG. 8) are very similar. Both controllers are finite state machines implemented by PLAs. In addition, each controller has a counter to count the 16 bits of the data going by. The task of the input controllers is to communicate with the bottom and right neighbors respectively and to input the data from the neighbors. The bottom controller is slightly more complicated than the right controller. It has additional hardware to strip 3 bits out of the coming instruction word and to rearrange the instruction bits. See also detailed explanation below.

The output controller 27 (FIG. 8), like the input controllers, is a finite state machine, implemented by a PLA. Also, like the input controllers, it has a 16-bit clock counter. The output controller communicates with its top or left neighbor. (The output controller doesn't "know" which one it is communicating with). It transmits to the neighbor the data stored in the output or the intermediate registers.

DETAILED DESCRIPTION

Referring to FIG. 6, the curve-solid classification machine (CSC) is made of N primitive classifiers (PCs) 1, $\log_2(N)\times N$ array of classification combine processors (CC)2. Each PC is connected to a CC in the bottom row of the array. All the PCs are connected to the classification machine bus 5. Each PC is allocated a range of addresses on the bus for its internal registers. Each internal register can be loaded directly from the bus 5. An interface unit 3 interfaces between the main memory of the host computer 6 and the classification machine. To the interface unit 3, each register in any of the PCs looks like a word in memory. All data and instructions to the CSC are loaded via the PCs. The registers of the PCs are loaded directly from the CSC bus 5. The CC machines 2 are loaded bit serially from the bottom up. Each column of the array is loaded by packaging the 3 bits of instructions for each CC processor 2 in two words. These instructions are passed up the column and each processor strips the 3 bits of its instruction and passes the rest of the information up the column.

The result of the computation comes out the top left corner of the combine array. The results are buffered and stored in the host computer memory 6 by the DMA unit 4.

Primitive Classifier Architecture

Referring to FIG. 7, each primitive classifier (PC) is made of four main functional blocks. The data-path 11, the main controller 12, the output controller 13 and the output buffer 131. The data path incrementally computes the intersection of lines with linear and quadratic half spaces. The main controller 12 controls the data path 11 and the output controller 13. It also communicates with the outside world. The output controller task is to communicate with the CC processor directly above it. The output buffer stores the computation results from the data path, data, or instructions coming from the outside. Data or instructions are passed to the CC above using the same protocol that is used in the combine array for communication between the CCs.

The Primitive Classifier Data Path

Referring to FIG. 9, the PC data path 11 is made of two pipelines that operate in parallel feeding a bit serial adder 114 and a bit serial subtractor 117. The main pipeline (Units 112, 114, 116) incrementally computes the square root of the discriminant, that is: $SQRT((B/2A)^2-C/A)$. The second pipeline unit 111 incrementally computes B/2A. The results from these two pipelines are used to compute B/2A+SQRT() using the adder 119 and B/2A−SQRT() using the subtractor 117. The main pipeline has a quadratic polynomial evaluation unit 112 that incrementally computes $(B/2A)^2 - C/2A$. The computation is bit serial, two bits at a time. The next stage in the pipeline is a bit reversal unit 114 that reverses the order of the bits in the result. The least significant bit become the most significant one and vice versa. This is done since the quadratic polynomial evaluation unit computes the least significant bit first and the next stage, the square root unit 116, needs the most significant bits first. The next stage is a bit serial square root unit 118. This unit require two bits at a time. It outputs one bit of result at a time. The results from the square root unit go to the bit serial adder 119 and the bit serial subtractor 117. All the registers of the data path are connected to an internal bus 110. Each register has an address on the bus and is loaded from the outside (from the host computer 7, FIG. 6) by writing into that address.

The Quadratic Evaluation Unit

Referring to FIG. 10, the quadratic polynomial evaluation unit is made of two main blocks. The main unit is a second degree evaluation unit. It is made of two bit serial adders 1120, 1122 and three shift registers 1121, 1123, 1124. The two adders are bit serial, adding two bits at a time. The shift register shifts two bits at a time. The first adder 1122 adds the two numbers in registers 1123 and 1124. The results of this addition are fed back into register 1123 and into the next adder 1120. The second adder 1120 adds the result from 1122 to the number in 1121. The result from adder 1120 is added, fed back to register 1121 and is output to the next pipeline stage. This quadratic evaluation unit computes the recursion relation $\Delta P_{i+1} = \Delta P_i + \Delta^2 P$; $P_{i+1} = P_i + \Delta P$ in a pipelined manner. The second unit, the coefficient update unit is used to update the divided difference coefficients in registers 1123 and 1121. In that case The MUX 1125 is set to receive the results computed by the second degree unit (adders 1127, 1129 and registers 1128, 1130 and 1131) so register 1121 is updated. Similarly, MUX 1126 is set to receive the values of the first degree unit (adder 1132 and registers 1133, 1134) so that register 1123 is updated. All the registers are connected to the internal bus 110 (not shown) and can be loaded from the bus.

The Bit Reverse Unit

Referring to FIG. 11, the bit reversal unit 114 is made of two parallel loadshift registers 1140 and 1141. The bits are shifted in to register 1140, then they are transferred to register 1141 and are shifted out in the reverse order. In addition there is circuitry, two NOR gates 1147, to detect if the number in register 1140 is positive or not. The results of that circuit go to the main controller 12.

The Square Root Unit

Referring to FIG. 12, the bit serial square-root unit 116 is a 6-bit unit that illustrates the operation of the 16-bit unit in the primitive classifier. The Bit-Serial Square-Root unit 116 is made of a Controlled Adder-Subtractor unit (CAS) 1161. The CAS unit 1161 adds or subtracts its bottom input from its top input depending on the control line 1166. If the control is 0 (low) then it adds, if it is 1 (high) then it subtracts. Feeding the CAS are two registers: The R register 1162 and the Q register 1163. The R register 1162 is a collection of D Flip-Flops (DFF). The output from the CAS 1161 is connected back into R register 1162 shifted by two positions to the left. The carry out of the CAS is used to detect when the result of the addition-subtraction is positive. The carry out is fed into a D flip-flop 1164. The value in the D flip-flop 1164 is used to control the CAS, as the third bit in the Q register 1163, the lowest order bit that was computed so far, and its inverse is the second lowest order bit in the Q register. The lowest bit in the Q register, 1167, is always 1. The higher portion of the Q register is a shift register. At each clock on line 1176, it holds one more digit of the square root. The square root computation starts by resetting the R register, loading the first two bits into the CAS, setting the DFF 1164 to high and resetting the Q register. On the next clock the first bit of the square root is computed. Each clock, two more bits are loaded onto the square root unit 116 on lines 11431 and 11430. The carry out (C out 1160) of the CAS is the next lower bit of the square root. The computation continues until the Q register is full. Then the result is transferred from the Q register to the bit reverse register. The bits come out of the bit reverse register with the least significant bit first.

The Linear Evaluation Unit

Referring to FIG. 13, the Linear Evaluation Unit 111 is made of a bit serial adder 1110 and two 16-bit shift registers 1112, 1111. The unit evaluates a linear recurrence relation. The values in registers 1112 and 1111 are added and stored back into register 1112. The register update unit is also made of a bit serial adder 1114 and two shift registers 1116 and 1117. The unit operation is controlled by the main controller (12, FIG. 7). The control line shift 1212 shifts the registers 1111 and 1112. If the Update control line 1214 is on, the update unit (FIG. 10) is activated and MUX 1113 loads register 1112 with the value computed by the bit update unit.

PC Output Section and Buffers

Referring to FIG. 14, the PC output controller task is to communicate with the bottom input controller of the CC directly above it. The controller is made of a finite state machine 1300 implemented as a PLA, a 16-clock timer 1304 and output multiplexers 1305, 1306. The output buffers are made of two pairs of shift registers 1310–1311 and 1312–1313.

The data from the data path 11 (FIG. 9) is shifted into registers 1310 and 1312 (least significant bit first) and is transferred under the PC main controller control 1263 into registers 1311 and 1313, inverting the most significant bit. The data is shifted out of registers 1311 and 1313, most significant bit first, under the output controller control 1303. Registers 1310 and 1312 could also be loaded by the host via the local bus 110 (not shown).

The output multiplexers 1305 and 1306 are used to control the data flow to the output ports Tout 1321 and Lout 1320. MUX 1305 has the following inputs: The output of register 1311, ground, header1 1272, header2 1273 and trailing out 1322. It is controlled by the three control lines Tselect 1307, SelectHeader 1308 and headers 1309. Using these controls, the output controller outputs the trailing out 1322 signal for hand shake protocol, the headers 1272, 1273 or a line segment. The mode control line 1255 controls whether ground or the output from register 1311 are used. Similarly, the mode bit 1254 controls whether the output of register 1313 will be used or high signal (all ones).

Output Controller Flow Diagram

Referring to FIG. 15, the output controller starts in an idle loop Q1 waiting for the output buffer to be full. When the output buffer is full, it initiates the handshake protocol with its parent processor. (Top or left neighbor). It raises the To signal and waits for Lo to be raised Q2. If it is raised, it starts transmitting the header information Q3,Q4. If the first bit in the header is zero Q5, then an interval segment is going to be transmitted. It then waits for the other processor to reply by lowering the Lo line Q9. When it does, it starts the timer to send the data out Q10. When the timer goes off Q12, it resets the outbuffull flipflop and goes back to the idle loop Q13.

If the first bit of the header is 1, then it looks at the second bit. If the second bit is 1, Q5, then a new instruction is being passed. The controller waits until the parent processor lowers the Lo line Q9 then starts the timer Q10. When the timer is off Q12, it resets the outbuffull flipflop Q13 and goes to the idle loop again. If the second header bit is 0, then the EOL signal is being passed. The controller waits for the parent processors to lower Lo Q7 then it resets outbuffull Q8 and goes to the idle loop. No data is being passed.

The PC Main Controller

Referring to FIG. 16, the task of the PC main controller 12 is to control the data path, the output controller and to communicate with the outside world (i.e. the host computer.) The controller is made of a finite state machine (FSM) 1200 implemented as a PLA. In addition, the controller has a 16-clock timer 1210, two counters, the X counter made of a 16-bit register 1220 and a decrement unit 1221, and a Y counter with a 16-bit register 1230 and a decrement unit 1231. The X register 1220 and Y register 1230 are connected to the bus 110 (now shown in the figure.) The registers can be loaded from the bus by the host computer. The X register is used to store the number of lines to classify in each row and the Y register stores the number of rows.

The valid buffer 1240 is a two-bit wide, three-bit long shift register. It is used to store the status of the data in the three stages of the pipeline.

One bit position indicates whether the output is present (signal 1242) and the other bit indicates whether the output is a valid line segment (signal 1243). The out present signal 1242 is computed as NAND of X count=0 and Y count=0. Output valid comes from the bit reverse unit and it is on if the number in the bit reverse unit is positive. The output valid computation can be overridden by setting a bit 1257 in the mode register 1250. The valid buffer can be reset by the controller using signal 1244. A three input NOR gate 1241 is used to compute whether the pipeline is empty. The mode and headers register 1250 is a six-bit latch. It is connected to the local bus 110 (not shown in the figure) and can be loaded by the host. Two bits are used to store header information. Each interval segment or instruction loaded into the CSC machine is preceded by two bits of header information. The headers are generated by the main controllers. They can also be loaded from the outside.

Two bits of mode 1254 and 1255 are used to control the leading or trailing MUXes 1305 and 1306 (FIG. 14) to select whether the output will come out of the register or will be a constant $+\infty$ or $-\infty$. One bit 1256 tells the main controller whether the information is to be loaded from the outside or not (pass mode). The last bit 1257 is used to mask the OutValid bit.

An RS flipflop 1260 is used to communicate with the output controller. The flipflop is set by the main controller to indicate that the output buffer has information in it. The flipflop is reset by the output controller to indicate that the output buffer is empty.

Main Control Flow Diagram

Figure 17:
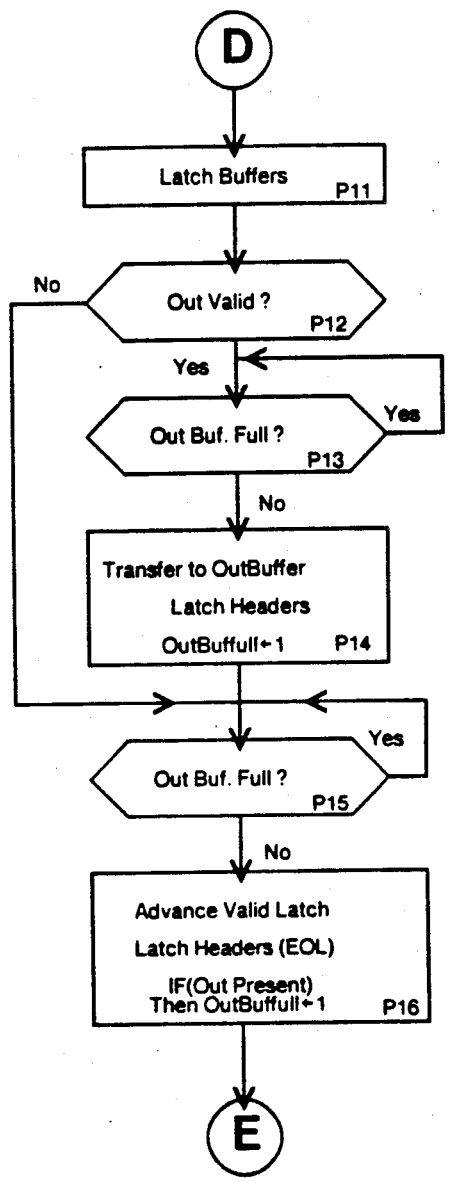
FIGS. 17 A, B, & C is the flow diagram of the PC main controller.
Figure 17:
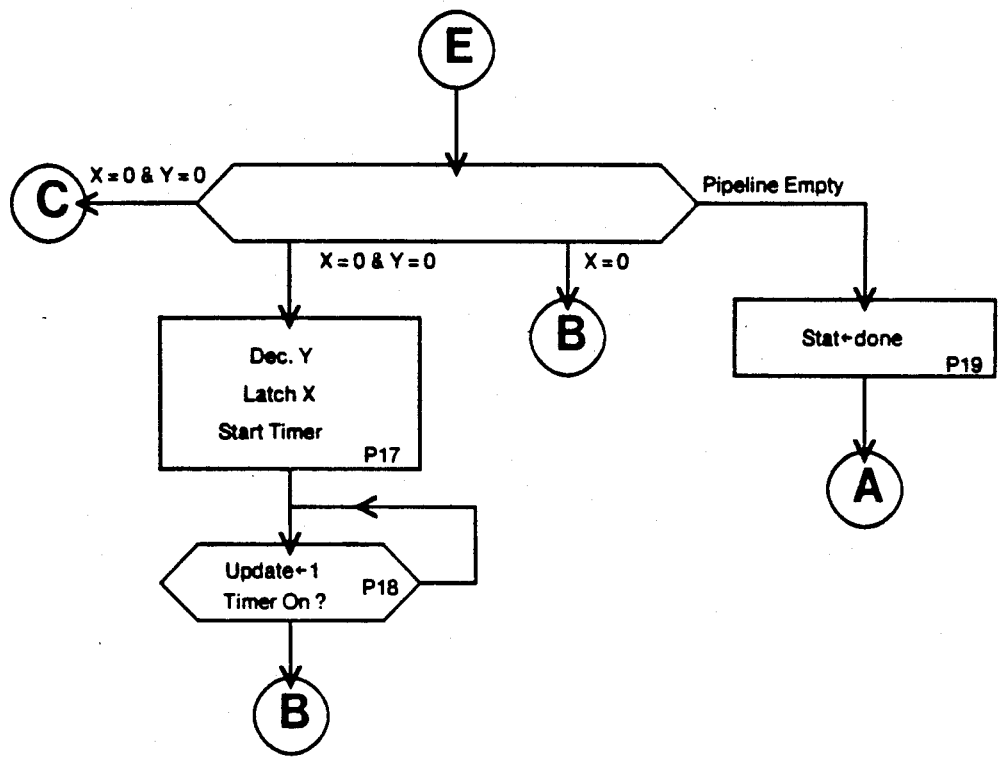

Referring to FIG. 17A, the main controller starts at an idle state P1. The idle output is on to indicate to the host that the PC is idle. When the controller receives the go command from the host (if it is not in a pass mode), it latches the X and Y registers values into the decrement units and resets the data path valid buffer P2 If either X or Y registers are zero, then an error flag is set P8 and the processor goes to an idle state. Now the processor starts the main computation loop. Y count is decremented P4 and X register is decremented P5 and then the timer is started P6. The timer-on signal stays on for 16 clocks P7. It is also used as the shift control for the data path. When the timer goes off, the latch buffers signal goes on for one clock P11. This signal activates the transfer in the bit reverse unit and the SQRT unit. If there is a valid output at the end of the pipe P12 (see FIG. 17B), that is, the output valid bit is on, then the main processor waits until the output buffer is empty P13. It transfers the data into the output buffer and latches the value line segment into the header buffer P14. If the output at the end of the pipe is not valid, that is, the line did not intersect the primitive, the main controller skips that part. It then waits for the output buffer to be empty P15. When the buffer is empty, it latches end-of-line (EOL) code into the header buffer. It shifts the valid-buffer once and if there was an output at all at the top of the pipeline it signals that output buffer is full P 16. (At the beginning, the pipeline needs to be filled by going through the loop 3 times but no output is available at the end of the pipe).

At the end of the loop there are four different cases:
Case 1: Pipeline-is-empty.

In this case status is set to done and the processor goes to the idle loop P19.
Case 2: End of a line X=0 and Y≠0.

In this case a whole line of rays was done so the Y counter is decremented and the X register is latched into the X counter. Then the timer is activated with the update signal on P17,P18 (FIG. 17C). This has the effect of updating the coefficients of the quadratic and linear evaluation unit. Then the controller goes to the beginning of the loop P5.
Case 3: X≠0

In this case the controller goes to the beginning of the loop P5.
Case 4: X=0 and Y=0

In this case, the pipeline needs to be emptied. The controller goes into the loop without decrementing the X counter P6.

In the case the processor is in pass through mode, when the go signal is active the processor waits for the output buffer to be empty P9 then the values are transferred to the output buffer and the processor goes to the idle loop P10.

Classification Combine Processors

Returning to FIG. 4 and FIG. 6, the classification combine CC array is made of $\log_2(N) \times N$ array of identical combine processors each indicated at 2 in FIG. 4. Each combine processor has two input ports that come from its right and bottom neighbors and one output port 21, 22 that goes to both its top and left neighbors. Each input port and the output port has two wires L and T (210, 220; 212, 222; and 221, 211, FIG. 8). The L wire carries the data of the leading edge of the interval segments, and T the trailing edge.

Combine Processor Data Path

Referring to FIG. 18, the combine data path (combining section 24, FIG. 8) is made of an input multiplexer 244, a min-max comparison network 240, an output multiplexer 243 and two decoding PLAs 246, 247. PLA 246 controls the output multiplexer 243. It receives a three bit code from the main controller 2301, 2302, 2303 and decodes it into five controls: "union" 2461, "intersection" 2462, "other" 2463, "pass-bottom" 2464 and "pass-right" 2465. The output multiplexer 243 selects four outputs $L_o$ 2434 and $T_o$ 2433 that are the leading and trailing edges of the intermediate interval and $L_i$ 2432 and $T_i$ 2431 which are the leading and trailing edges of the output interval. The outputs from this multiplexer are fed into the intermediate and output registers. The inputs to the multiplexer are five pairs of values. $L_1$ 2410, $T_1$ 2411; $L_2$ 2412, $T_2$ 2413; $\min(L_1,L_2)$ 2414, $\max(L_1,L_2)$ 2415; $\min(T_1,T_2)$ 2416, $\max(T_1,T_2)$ 2417; and $\min(\max(L_1,L_2),\min(T_1,T_2))$ 2418, $\max(\max(L_1,L_2),\min(T_1,T_2))$ 2419. The second PLA 247 receives the same control bits 2301, 2302, 2303 and the comparison results from the min-max comparison network 240. The signals are: $T_1>T_2$ 2402, $T_1<T_2$ 2402, $L_1>L_2$ 2404, $L_1<L_2$ 2405, $T_1>L_2$ 2405, $T_1<L_2$ 2406, $L_1>T_2$ 2407, $L_1<T_2$ 2408. The PLA computes the control values for the input multiplexer 244 for the next cycle. The values are latched into the control latch 245 at the end of the comparison cycle when all the bits were compared. Also, the PLA computes whether there is valid output in the output buffer (output line 2471). Two of the outputs of the latch 245, want_down 2455 and want_bottom 2456 are also connected to the main controller. These two signals tell the main controller which inputs to get into the next cycle. Table 1 summarizes the computation of want_intermediate 2451, want_down 2452, want_right 2453 and out valid 2471, as well as the functions of the input MUX 244 and the output MUX 243.

The input multiplexer 244 has seven inputs and four outputs. The inputs are Lo 283, the leading part of the OUTPUT register, $L_i$ 282 and $T_i$ 281, the two outputs of the INTERMEDIATE registers, $L_b$ 262, and $T_b$ 261, the two bottom inputs, and $L_r$ 252 and $T_r$ 251, the right inputs. The outputs are $L_1$ 2444, $T_1$ 2443, $L_2$ 2442 and $T_2$ 2441. Controlling the multiplexer 244 are three control values, want_intermediate 2451, want_down 2452, and want_right 2453. These values are latched into latch 245. The latch is controlled by the latch line 2450 coming from the mail controller.

TABLE 1

| opr | code | Output MUX control lines | condition | out | Input MUX control lines | | | Outputs of input MUX | | | | Final Outputs of output MUX | | | |
|---|---|---|---|---|---|---|---|---|---|---|---|---|---|---|---|
| | | | | | want bottom | want right | want intermediate | $L_1$ | $T_1$ | $L_2$ | $T_2$ | $L_o'$ | $T_o'$ | $L_i'$ | $T_i'$ |
| B∪R | 101 | union | $T_1=T_2$ | 1 | 1 | 1 | | $L_b$ | $T_b$ | $L_r$ | $T_r$ | minL | minT | maxL | maxT |
| | | | $T_1>T_2$ | $L_1<T_2$ | 0 | 1 | 1 | $L_i$ | $T_i$ | $L_r$ | $T_r$ | | | | |
| | | | $T_1<T_2$ | $T_1>L_2$ | 1 | 0 | 1 | $L_b$ | $T_b$ | $L_i$ | $T_i$ | | | | |
| B∩R | 100 | inter | $T_1=T_2$ | 1 | 1 | 1 | | $L_b$ | $T_b$ | $L_r$ | $T_r$ | maxL | minT | maxL | maxT |
| | | | $\sim(L_1>T_2)(T_1>T_2)$ | 0 | 0 | 1 | 0 | $L_o$ | $T_i$ | $L_r$ | $T_r$ | | | | |
| | | | $L_1>T_2$ | 1 | 0 | 1 | 1 | $L_i$ | $T_i$ | $L_r$ | $T_r$ | | | | |
| | | | $\sim(L_1>T_2)(T_1<T_2)$ | 0 | 1 | 0 | 0 | $L_b$ | $T_b$ | $L_o$ | $T_i$ | | | | |
| | | | $T_i<L_2$ | 1 | 1 | 0 | 1 | $L_b$ | $T_b$ | $L_i$ | $T_i$ | | | | |
| B-R | 110 | other | $T_1=T_2$ | $L_1<L_2$ | 1 | 1 | | $L_b$ | $T_b$ | $L_r$ | $T_r$ | minL | minX | maxX | maxT |
| | | | $T_1>T_2$ | $L_1<L_2$ | 0 | 1 | 1 | $L_i$ | $T_i$ | $L_r$ | $T_r$ | | | | |
| | | | $T_1<T_2$ | $L_1<L_2$ | 1 | 0 | 1 | $L_b$ | $T_b$ | $L_i$ | $T_i$ | | | | |
| R-B | 111 | other | $T_1=T_2$ | $L_1>L_2$ | 1 | 1 | | $L_b$ | $T_b$ | $L_r$ | $T_r$ | minL | minX | maxX | maxT |
| | | | $T_1>T_2$ | $L_1>L_2$ | 0 | 1 | 1 | $L_i$ | $T_i$ | $L_r$ | $T_r$ | | | | |
| | | | $T_1<T_2$ | $L_1>L_2$ | 1 | 0 | 1 | $L_b$ | $T_b$ | $L_i$ | $T_i$ | | | | |
| B to o OR R to i | 010 | pass1 | | | 1 | 1 | | $L_b$ | $T_b$ | $L_r$ | $T_r$ | $L_1$ | $T_1$ | $L_2$ | $T_2$ |
| B to i OR R to o | 011 | pass2 | | | 1 | 1 | | $L_b$ | $T_b$ | $L_r$ | $T_r$ | $L_2$ | $T_2$ | $L_1$ | $T_1$ |

Table 1 Explanation

Table 1 summarizes the Input and Output MUX operation, as well as the inputs and outputs of PLA 246 and PLA 247 (see FIG. 18). Column 1 gives the operator currently used. Column 2 gives the control code C 2301-2303. Column 3 gives which output MUX control line is high. Column 4 gives what the test condition was in the previous cycle. Column 5 gives the value of the Output variable 4471. Columns 5, 6 and 7 give the values of the control lines for the Input MUX 244. Columns 8, 9, 10 and 11 give the values of the outputs of the Input-MUX 244. Columns 12, 13, 14 and 15 give the values of the Output-MUX 243. MinL stands for minimum($L_1,L_2$), MinT is minimum($T_1,T_2$), maxL is maximum($L_1,L_2$), maxT is maximum($T_1,T_2$), minX is minimum(maxL,minT), and maxX is maximum(maxL,minT).

The Min-Max Network

Referring to FIG. 19, the min-max network is made of a five identical functional blocks: 2421, 2422, 2423, 2424, 2425. Each block is a finite state machine that computes bit serially max(a,b) min(a,b) a>b b<a for its inputs a and b. The comparison results (signals 2401-2408) are fed into the PLA 247 and the min-max results (signals 2410-2419) are fed into the multiplexer 243.

The Combine Registers

FIG. 20 describes the CC machine register set. There are two pairs of registers. The OUTPUT pair 281, 282 and the INTERMEDIATE pair 283, 284. Each register is a 16 bit shift register. In addition there are two, two-bit registers that are used to store the header information. The inputs 2431-2434 come from the multiplexer 243 of the combine section. The outputs of the registers 2811, 2821, 2831 2841 and the headers 2850, 2851, 2852, 2853 go into multiplexers 271, 272 controlled by the output controller 270. See FIG. 21.

The Combine Output Section

FIG. 21 shows the output control section. The output section has a finite state controller 270, a 16-clock interval timer, 2702, and two multiplexers 271 and 272. Multiplexer 272 selects the output for the leading line 21 and is controlled by WhichBuffer (2721). If WhichBuffer is 0, the output register (2811) is selected, and if WhichBuffer is 1, the intermediate buffer (2831) is selected. Multiplexer 271 selects the output for the trailing line 22 and has 4 control lines, WhichBuffer, (2721), SelectHeader (2724). TSelect (2725) and Headers (2723). The output of this multiplexer is selected from seven inputs, one of which is supplied by the controller (trailing out 2722) in order to initiate the handshake protocol. Table 2 shows the operation of multiplexer 271. The interval timer 2702 counts the 16 clock cycles necessary to shift out the data. It is started when the data is ready to be shifted out. The inputs to the finite state machine (270) consist of the leading edge coming back from the parent node (21), the trailing edge being sent out by this node (273), OutputAvailable (275) from the main controller indicating that an output is available, and the signal from the interval time (2703) indicating that the data has been shifted out. There are seven outputs from the finite state machine. Four of these, 2724, 2725, 2723, and 2722 are used with multiplexer 271 as indicated above. OutputDone (274) signals the maincontroller that an output has started (OutputDone=high) so that the main controller can start another input, and that the outputting is done (OutputDone=low). StartTimer (2704) is used to start the interval time 2702, and 2701 is used to switch between handshaking mode and outputting mode.

The Combine Output Controller Flow Diagram

Figure 22:
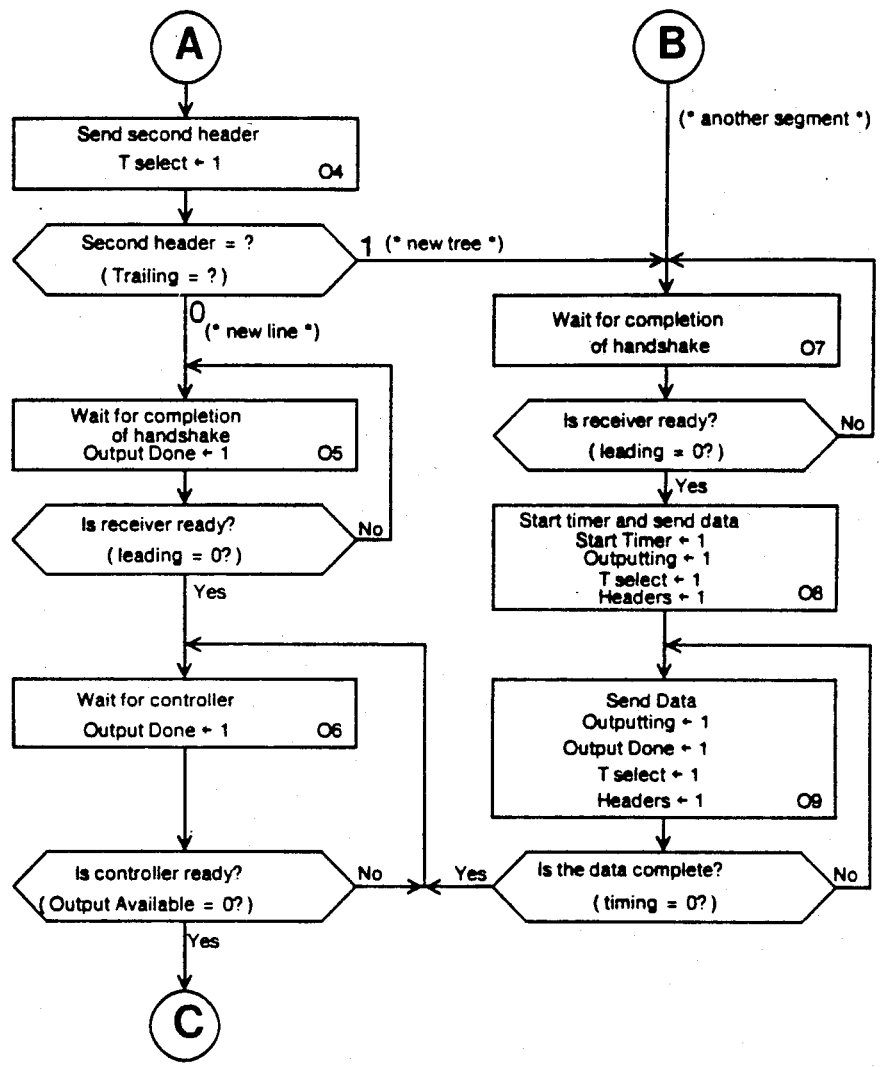
FIGS. 22 A & B is the flow diagram for the output controller shown in FIG. 21.

The state diagram for the finite state machine 270 is given in FIG. 22 A and B. The output controller is initially in the reset state O0. It stays in this state until the main controller indicates by a high on OutputAvailable (275) that a packet is ready to be sent, at which time it goes to state O1 and outputs a 1 on trailing out (2722) to start the handshake with the parent node. It waits in this state (O1) until leading (21) goes high, at which time it goes to state O2 and makes trailing out (2722) low. It immediately goes to state O3 and outputs the first header. If the first header is a one, it goes to state O4 to output the second header, otherwise the data to be sent is another line segment on the current line and it goes directly to state O7 to wait. From state O4, if the second header was a 0, it goes to State O5 indicating the end of the current line, otherwise it goes to state O7 to prepare to send out a complete packet. In state O7 the output controller waits for the parent node to indicate it is ready to receive a packet by a 0 on the leading edge (21). When this occurs it goes to state O8 and starts shifting out the data and starts the timer. It immediately goes to state O9, signals the main controller with a high on OutputDone (275), and shifts out the rest of the data. When the data is shifted out (2703 goes low), it goes to state O6. In state O5 there is no data to be sent, so when the handshake is completed (low on 21) the controller immediately goes to state O6. In state O6 the controller waits for the main controller to indicate it is ready, (OutputAvailable=0) and goes back to state O0.

TABLE 2

| TSelect | Headers | SelectHeader | WhichBuffers | Output |
|---|---|---|---|---|
| 0 | X | X | X | trailing out (2722) |
| 1 | 0 | 0 | 0 | Header 2 from output (2850) |
| 1 | 0 | 0 | 1 | Header 2 from intermediate (2852) |
| 1 | 0 | 1 | 0 | Header 1 from output (2851) |
| 1 | 0 | 1 | 1 | Header 1 from intermediate (2853) |
| 1 | 1 | X | 0 | trailing from output (2821) |
| 1 | 1 | X | 1 | trailing from intermediate (2841) |

The Combine Right Input Section

FIG. 23 describes the right input controller. This input controller consists of finite state machine 250 and an interval timer 2502. The inputs to the finite state machine are the trailing 251 and leading 252 wires from the son node, two signals from the main controller, Go 2508 and Active 2507, and the signal from the interval timer 2503 telling it when the interval timer is timing. There are also 6 outputs from the finite state machine. Two of these, leading 2509 and outputting 2501, control the handshake protocol with the son node. Start timer 2504 is used to start the interval timer, and the other two are ready signals 2505 and 2506 which go along with 2503 to the main controller to indicate the status of the right inputs.

Flow Diagram for the Right Input Controller

Figure 24:
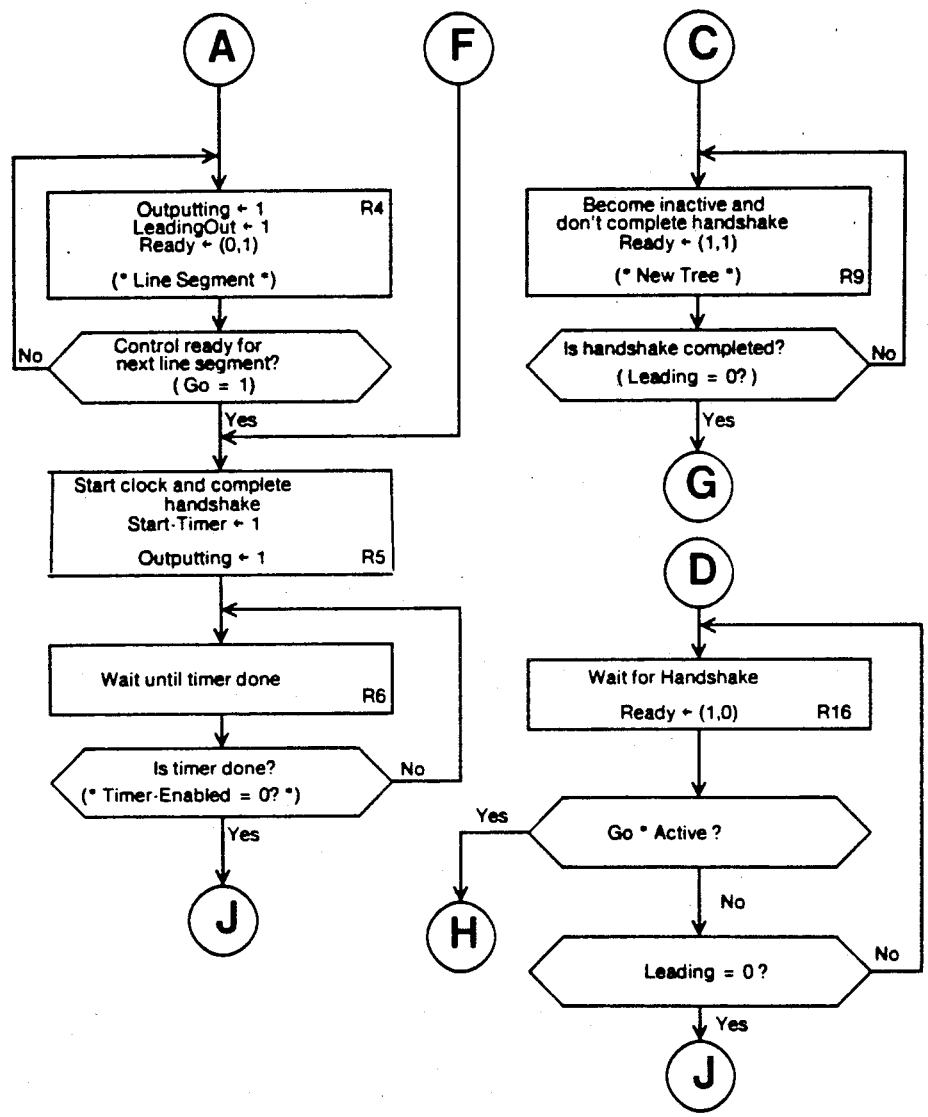
FIGS. 24 A, B & C is the right input controller flow diagram.
Figure 24:
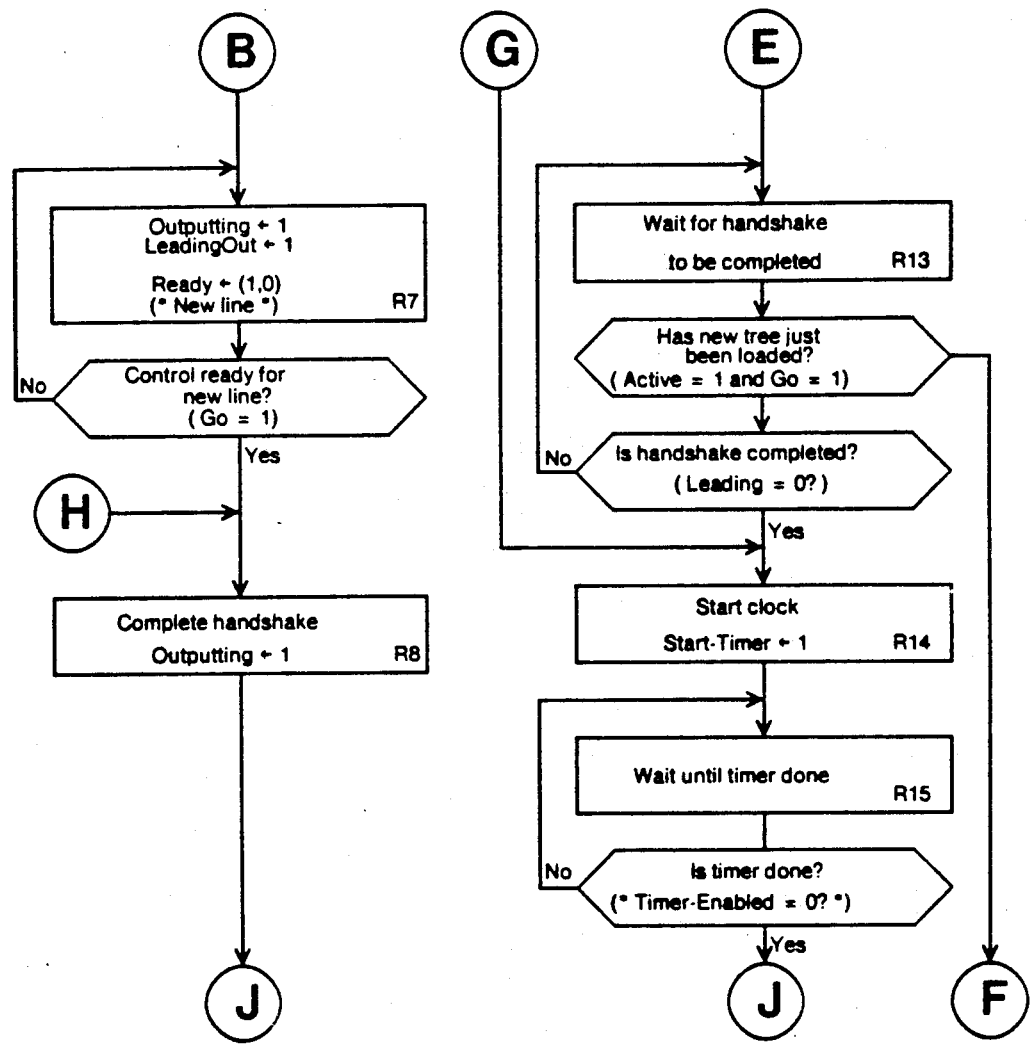

The state diagram for the finite machine 250 is given in FIGS. 24A and B. The right input controller is initially in the reset state R0. It stays in this state until the trailing 251 goes high indicating that the son node has output ready to send. If this occurs when the controller is active, the controller outputs a high, state R1, on the leading wire 211 to indicate that it is ready to receive headers indicating what type of input is coming. The headers are read in state R2 and possibly R3 with 0x indicating a line segment is coming, 10 indicating the end of the current line, and 11 indicating that a new tree is being loaded in the column to the right. If a line segment is coming, the controller enters state R4, signals the main controller with a 01 on ready (lines 2506 and 2505) and waits for the main controller to indicate it is ready to receive this input by a 1 on go (2508), whereupon it completes the handshake and starts the timer in state R5 and then waits in state R6 for the input to be completed and finally goes back to state R0. If an end of line indication is seen in state R3, the controller goes to state R7 and signals the maincontroller with a 10 on ready (2506 and 2505), waits in that state for the main controller to indicate it is ready for the next line with go 2508 and then completes the handshake in state R8 and goes back to state R0. If a new tree is indicated in state R3 the controller stops controlling the handshake line 211, and enters state R9. In this state it signals the main controller with ready=11 and enters state R14 of the set of states for the inactive controller which are described next.

When active (1507) is low, the controller follows the handshakes on leading and trailing in order to keep synchronized so that it will be in the proper state when a new tree is loaded which makes this node active. States R10, R11, R12, R13, R14, R15 and R16 shadow states R1, R2, R3, R4, R5, R6, and R7 respectively. If go (2708) and active (2707) are both high in state R13 or state R16, then the controller switches to the next corresponding active state R5 or R8.

The Combine Bottom Input Section

The bottom controller 25 which is shown in FIG. 25 is very much like the right input controller. The major difference between the two is the special mechanism added to the bottom controller that enables it to load new instructions (a new tree) into the combine processor. To configure a tree of processors, each processor in the array needs to receive 3 bits of data. The instructions to the combine array are loaded in pipelined fashion the same way interval segments are loaded. Instructions are loaded vertically. Each column of the array receives a packet of instructions from the primitive classifier at the bottom of the array. The instructions are packed, with bit 1 the most significant bit of the "leading" packet, and bit 2 the most significant bit of the "trailing" packet, and bit 3 the next bit of the "leading" packet. Bit 1, 2, and 3 for the next processor up the column are in the second bit of the "trailing" packet, and the third bit of "leading" and "trailing." When these instructions are being loaded (treeing=1), the circuit 264 swaps the leading and trailing packets with the trailing delayed by one clock. This will make the control packets indentical for each processor in the column.

Flow Diagram for the Bottom Input Controller

Figure 26:
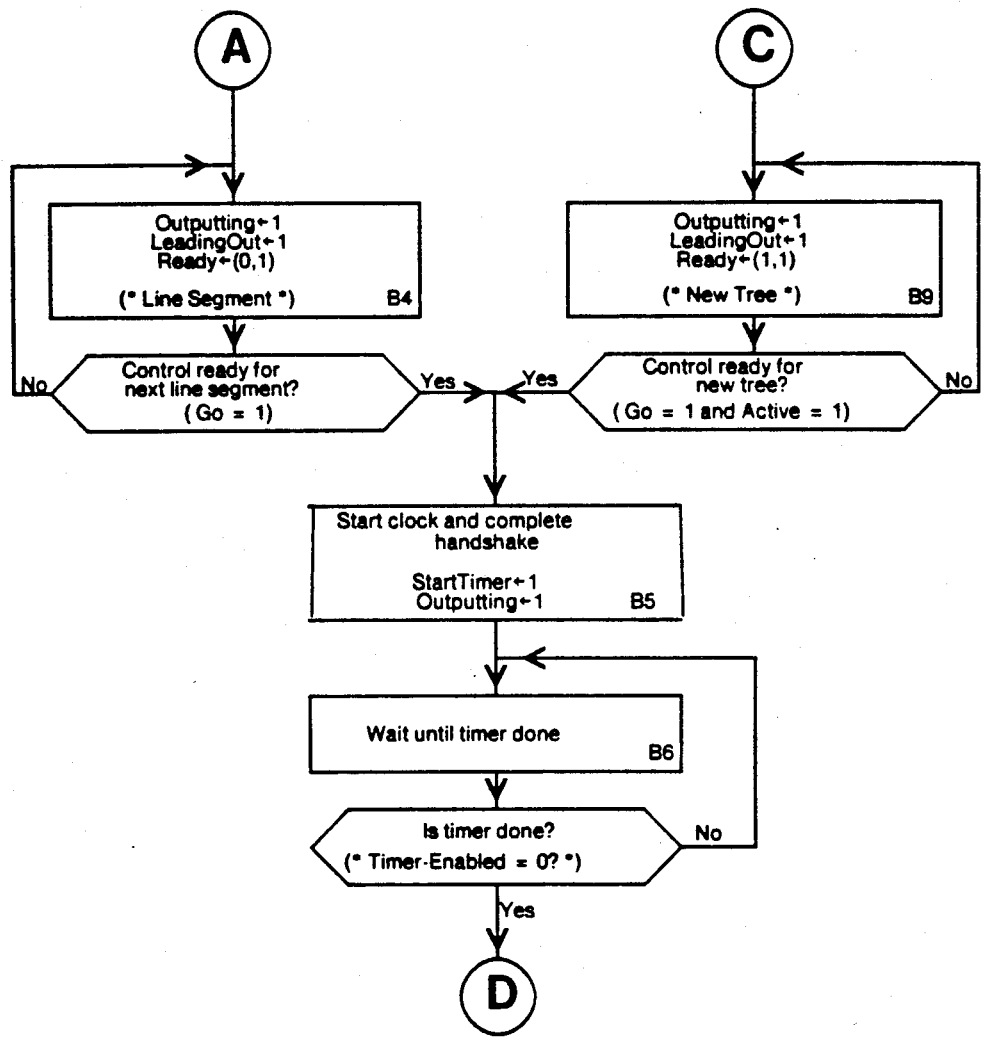
FIGS. 26 A-D is the botton input controller flow diagram.
Figure 26:
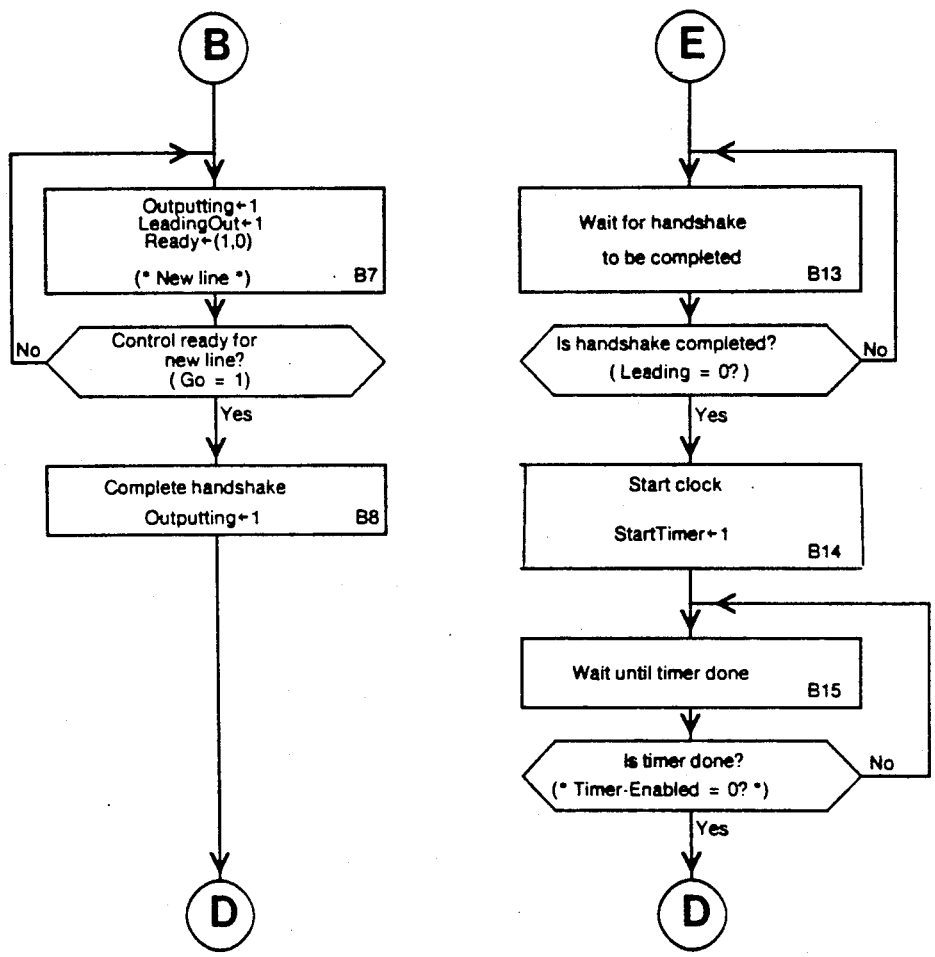
Figure 26D:
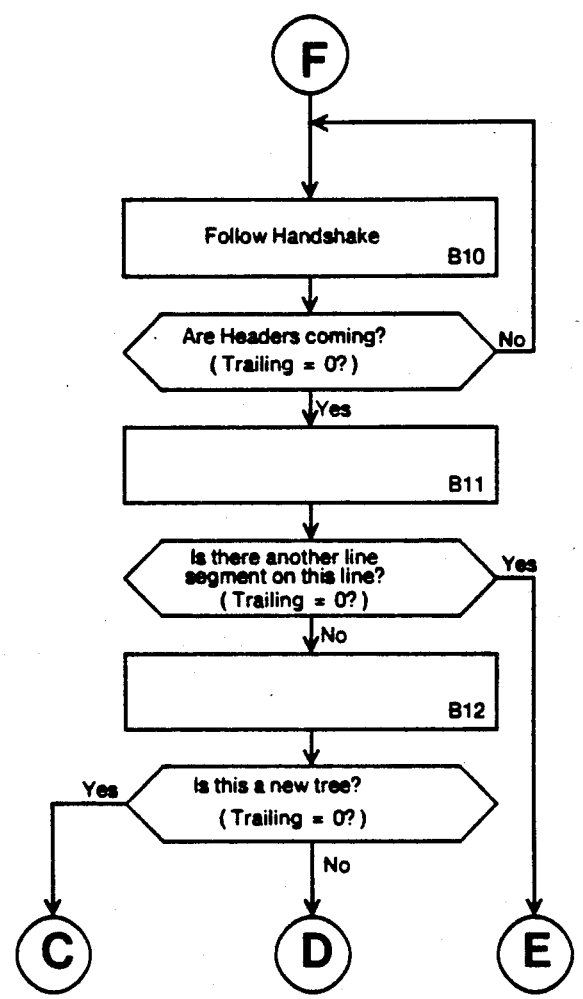
Figure 28:
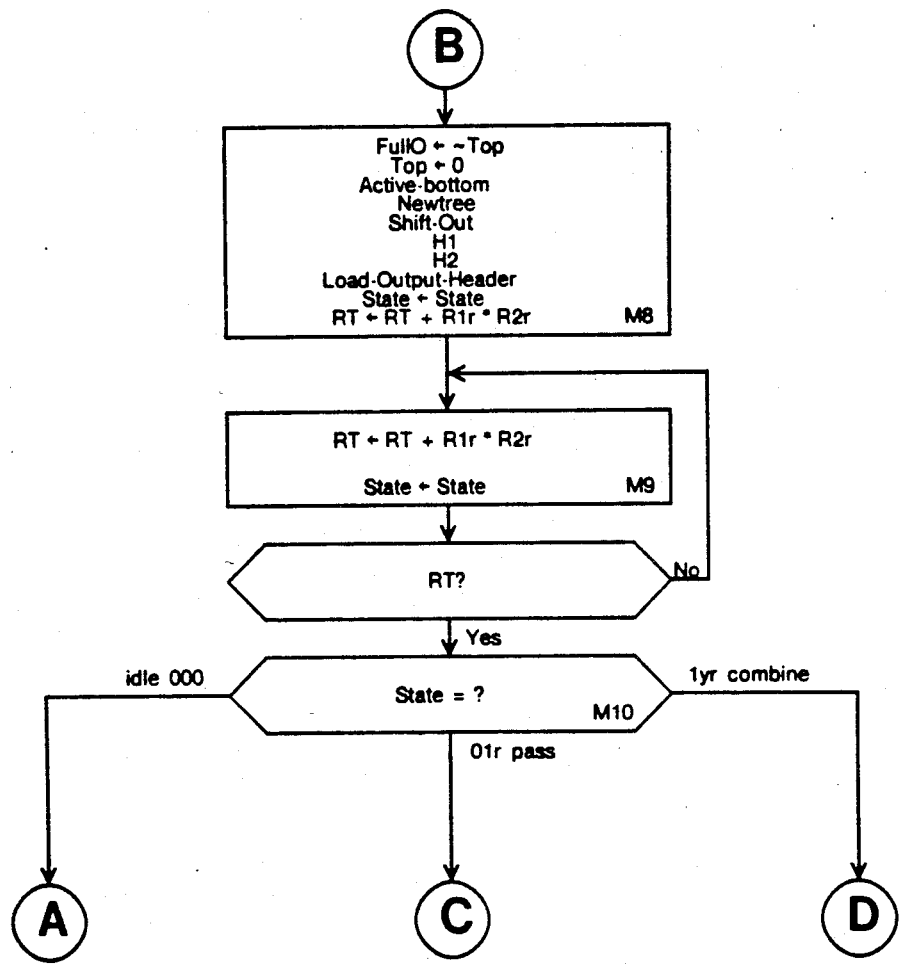
FIGS. 28 A-H is the main controller flow diagram.
Figure 28:
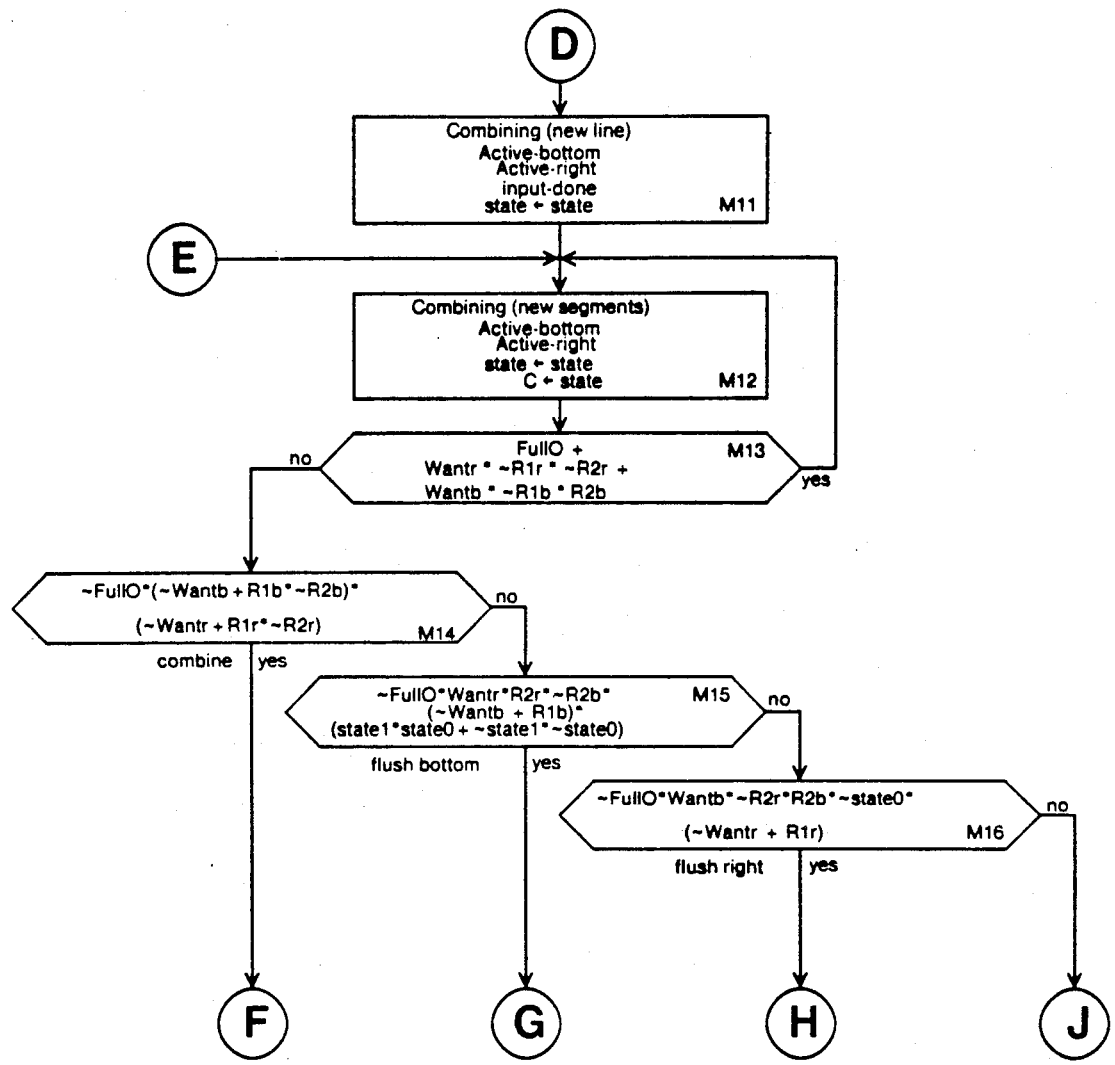
Figure 28:
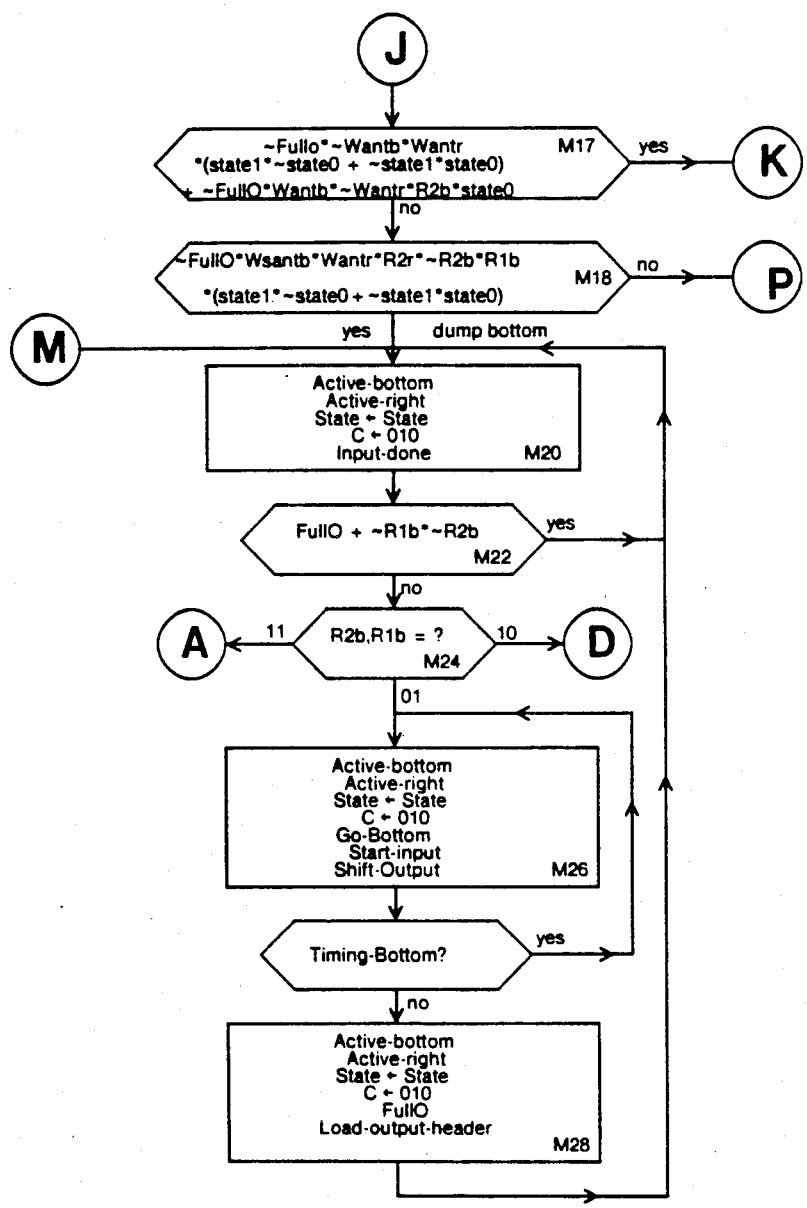
Figure 28:
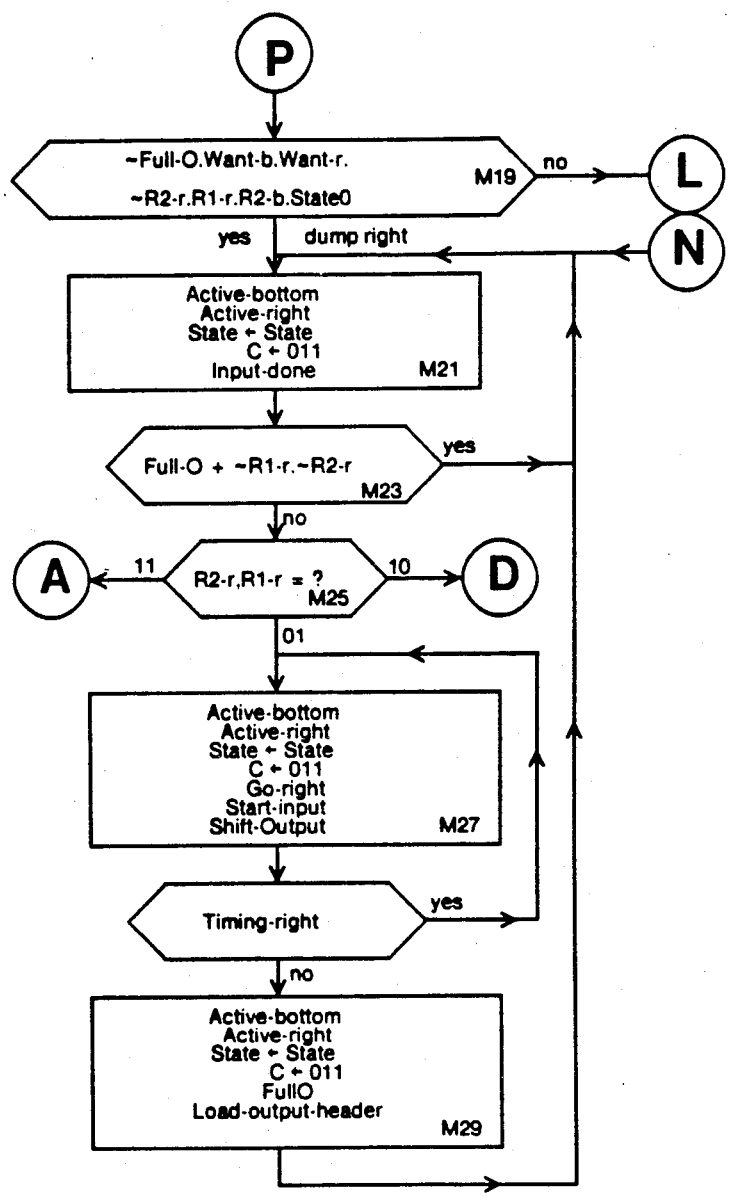
Figure 28:
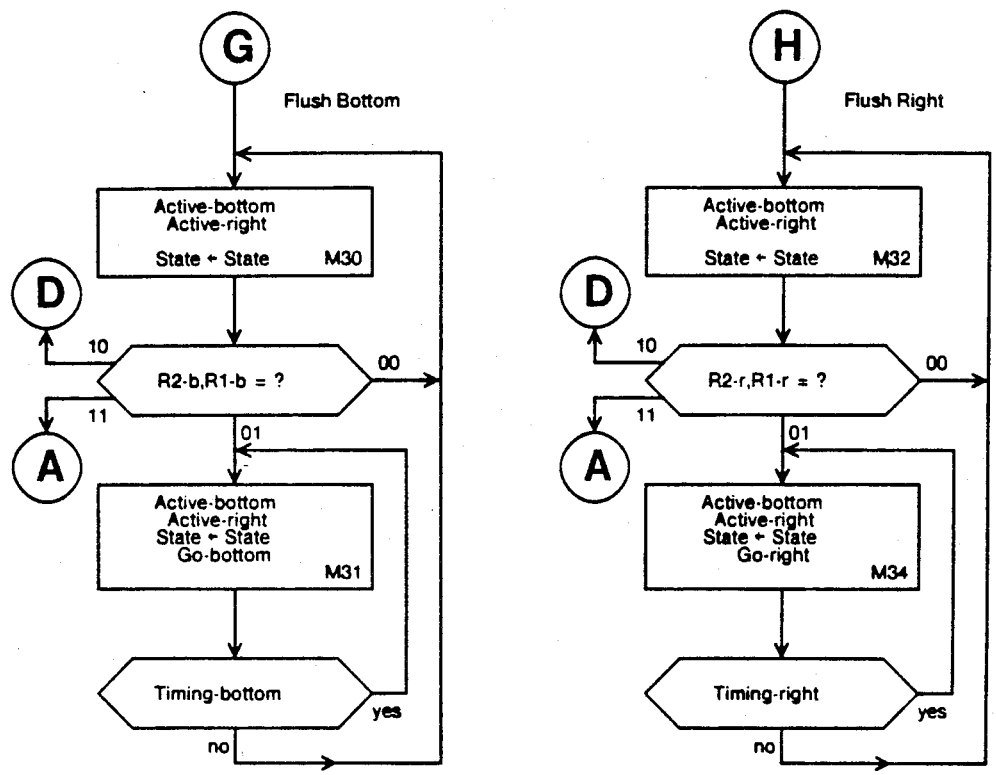
Figure 28:
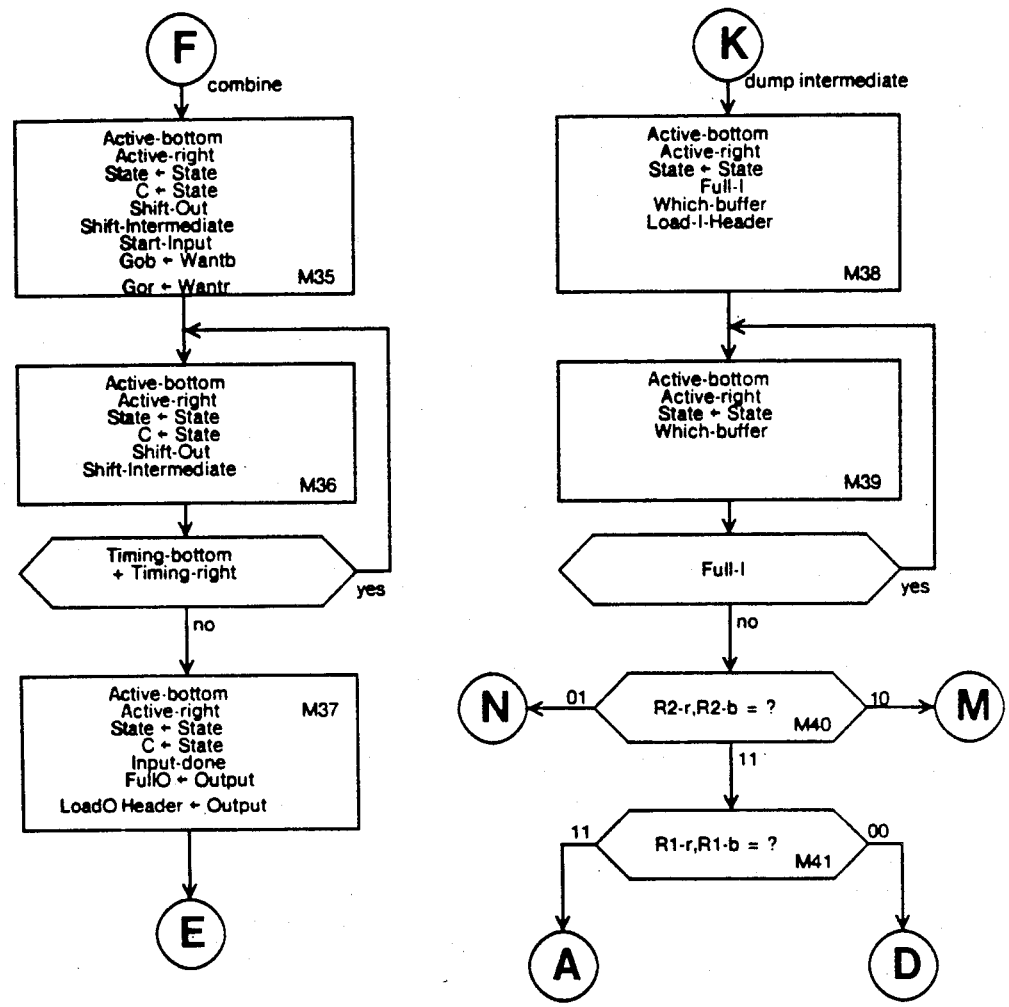
Figure 28:
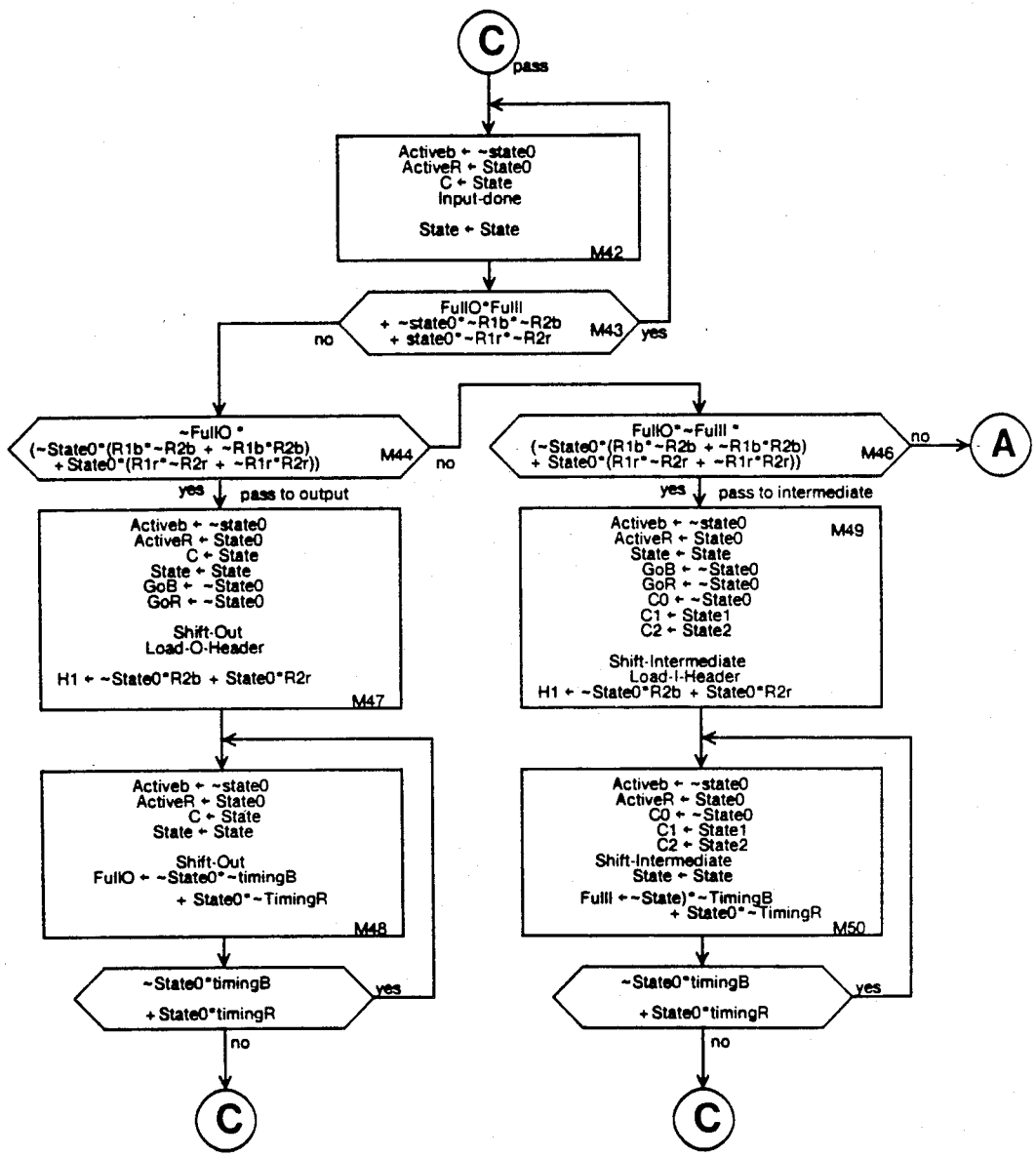

The state diagram for the finite state machine 260 is given in FIGS. 26A, C and D. The bottom input controller is initially in the rest state B0. It stays in this state until the trailing (2612) goes high indicating that the son node has output ready to send. If this occurs when the controller is active, then the controller outputs a high, state B1, on the leading wire (212) to indicate that it is ready to receive headers. The headers are read in state B2 and possibly state B3 with 0x indicating that a line segment is coming, 10 indicating the end of the current line, and 11 indicating that a new tree is being loaded. If a line segment is coming, the controller enters state B4, signals the main control with a 01 on ready (lines 2606 and 2605), and waits for the main controller to indicate it is ready to receive this input by a 1 on Go (1608), whereupon it completes the handshake and starts the timer in state B5 and waits in state B6 for the input to be completed and finally goes back to state B0. If an end of line indication is seen in state B3, the controller boes to state B7 and signals the main controller with a 10 on ready (2606 and 2605), waits in that state for the main controller to indicate that it is ready for the next line with Go (2608) and then completes the handshake in state B8 and goes back to state B0. If a new tree is indicated in state B3, the controller enters state B9, signals the main controller with a 11 on ready (2606 and 2605), waits for the main controller to indicate that it is ready for a new tree to be loaded with 11 on Go (2608) and Active (2607), and then goes to state B5 and B6 to read in the packets.

When Active (2607) is low, the controller follows the handshakes on leading and trailing in order to keep synchronized and be ready to read in a new tree. States B10, B11, B12, B13, B14, and B15 shadow states B1, B2, B3, B4, B5 and B6.

The Combine Main Controller

Referring to FIG. 27, the main controller 23 consists of a finite state machine. This controller implements the algorithms to the control the other 5 sections of the classification combine machine, 24, 25, 26, 27, and 28. There are two major algorithms. One of these is concerned with filling the register section with packets to be output. These may consist of instructions to reconfigure the tree, a line segment, or a line separator. This algorithm provides the control for the inout sections, 25 and 26, the combine section, 24, and most of the control of the registers, 28. The second algorithm is concerned with emptying those registers. It provides the control for the output section, 27 and some of the control for the registers, 28. The main controller has 12 inputs and 19 outputs.

Combine Main Controller Flow Diagram

The state diagram for the main controller in given in FIGS. 28A through E. The reset state is state M1 where the combine processor waits until the bottom input section indicates that the instructions for a new tree are being loaded from below. This is indicated by a Ready=1,1 (2606 & 2605) from the bottom input controller. When this occurs, the main controller shifts to state M2 and signals the bottom input controller (26) with a 1 on NewTree (2610), ActiveBottom (2607), and GoBottom (2608) to start shifting in a new packet. This is shifted into the Output register with a 1 on ShiftOutput (2363). In state M2 and one of M4 or M5 or M6, 6 bits are read. Three of the bits determine the state and the next three determine if this is the top processor on the column. If the second 3 bits are 000, then top is set to 1. The controller then goes to state M7, loads the output headers to indicate a new tree, and waits until the input is done (indicated by a 0 on TimingBottom, 2603). When the input is done, it goes to state M8 and if this is not the top of the column indicates that the output buffer is full. It also shifts the input buffer to bring the state for the next processor to the head on the output packet. It then goes to state M9, where it waits until the new tree has been loaded in the column to the right, indicated by Ready=1.1 (2506 & 2505) from the right input controller. At this time, the state of this processor has been loaded. There are three possibilities, tested in M10. The processor state is 000, indicating the processor is idle and the controller goes back to state M1 to wait for a new tree to be loaded. The processor state is 1XX, indicating that the processor is going to be actively combining, and the controller goes to state M11. The processor is 01X, indicating that the processor is going to be passing packets, and the controller goes to state M42.

If the processor is combining, it will reset the data path with C (2301, 2302, and 2303)=000 and Input- Done (2450)=1 in state M11. Throughout this section, ActiveBottom (2607) and ActiveRight (2507) will be high to indicate that inputs are coming from the bottom and the right. The controller will then go to state M12 where the data path control is set to the processor state and wait until the required inputs are available and the output register is available. This is tested in M13. When the above conditions are met, there are seven possible outcomes:

1. The needed line segments are available (tested by the condition in M14) and the controller goes to state M35 (Combine).

2. No more outputs are possible on this line, but there are more line segments on the bottom (tested by condition in M15). The controller goes to state M30 (Flush Bottom).

3. No more outputs are possible on this line, but there are more line segments on the right (tested by the condition in M16). The controller goes to state M32 (Flush Right).

4. The end of the current line has been seen on one of the inputs and as a result the intermediate register now needs to be output (tested by the condition in M17). The controller goes to state M38 (dump intermediate).

5. The end of the current line has been seen on the right, but the rest of the segments on the bottom input need to be output (tested by condition in M18). The controller goes to state M20 (dump bottom).

6. The end of the current line has been seen on the bottom, but the rest of the segments on the right input need to be output (tested by the condition in M19). The controller goes to state M21 (dump right).

7. The end of the current line has been seen on both inputs. The controller goes to state M1 (Ready=11 on both inputs) or state M11 (Ready=10 on both inputs).

State M20 is the beginning of a loop that dumps the bottom input to the output. Throughout the loop the mode C (2301-2303) of the data path is set to 010 to pass the bottom input to the output register. In state M20 the data path is reset by InputDone (2450)=1. The controller wait in this state until an input is available and the output register is not full. Then it goes to state M1 (Ready=11), State M11 (Ready=10) or state M26 (Ready=01). State M26 starts the input of the line segment with GoBottom (2608) and StartInput (2400) both high. It waits until the input is done and then goes to state M28, loads the output headers (2856=high) and goes back to state M20 to wait for another input.

State M21 is the beginning of a loop that dumps the right input to the output. Throughout the loop the mode C(2301-2303) of the data pat is set to 011 to pass the right input to the output register. In state M21 the data path is reset by InputDone (2450)=1. The controller waits in this state until an input is available and the output register is not full. Then it goes to state M1 (Ready32 11), state M11 (Ready=10) or state M27 (Ready=01). In M27 the input is started (2501=high and 23400=high) and the controller waits until the input is done. It then goes to state M29 to load the output headers (2856=high) and goes back to M21 to wait for another input.

State M30 is the beginning of a loop that removes unwanted input on the bottom input. The controller waits in that state until input is available from the bottom (Ready 2606 & 2605~=00). If a new line is indicated by Ready=10, the controller goes to state M11 to start a new line. If a new tree is indicated by Ready=11, it goes to state M1 to read in the new state. Otherwise, it goes to state M31 where the input is started and the controller waits until the input is finished before going back to state M30 to wait for another input.

State M32 is the beginning of a loop that removes unwanted input on the right input. The controller waits in M32 until input is available from the right (Ready 2506 & 2505~=00). If a new line is indicated by Ready=10, the controller goes to state M11 to start a new line. If a new tree is indicated by Ready=11, it goes to state M1 to read in the new state. Otherwise it goes to state M34 where the input is started and the controller waits until the input is finished before going back to state M32 to wait for another input.

In state M35 the controller is ready to read in another set of inputs. In that state the data path is reset with StartInput (2400), the needed inputs are started with go-bottom (2608) set to want-bottom (2454) and go-right (2501) set to want-right (2455), and the outputs of the data path are shifted into the registers with shift-output (2363) and shift-intermediate (2361). It then goes to state M36 and continues to shift into the registers until the input is done, indicated by a 0 on both timing-right (2503) and timing-bottom (2603). When the input is done, the controller goes to state M37 where, if there is output (2471=high), the state variable FullO is set and the headers are loaded with LoadOHeader (2856). The controller then goes to state M12 to wait for new segments. In state M38 the controller is about to output the intermediate buffer. It sets the intermediate buffer full, sets WhichBuffer (2721) to 1, loads 00 on h1 and h2 (2854 & 2855) into the intermediate headers with a high on Load-I-Header (2857) and then goes immediately to state M39. It waits in state M39 until the output has been started. This is indicated by Full going back to 0. When this occurs it goes to one of four states. If R2-Bottom (2605)=0, then there are line segments on the bottom input to be dumped to the output and the controller goes to state M20. If R2-Right (2502) is 0, then there are line segments on the right to be output and the main controller goes to state M21. If Ready-Bottom (2605 and 2606) and Ready-Right (2505 & 2506) are both 10, then a new line is indicated and the controller goes to state M11 to start the new line. Otherwise, both 'ready's are 11, indicating a new tree and the controller goes to state M1.

If the condition tested in M10 indicated that the processor is passing, it will go to state M42. In that state the data path is reset with InputDone (2450)=1. It waits there until a buffer is available and there is something to be passed. It looks at Ready-Bottom (2606 & 2605) if it is passing from below (indicated by State=010), or at Ready-Right (2506 & 2505) if it is passing from the right (indicated by State=011). If the appropriate Ready is 10 or 01 then there is something to be passed. In this case, it goes to state M47 if the output buffer is empty or to state M49 if the ouput buffer is full and the intermediate buffer is empty. If both buffers are full or the appropriate Ready is 00, it stays in state M42. It must also wait (in state M42 if a new tree is indicated and the intermediate buffer is full. Otherwise, the appropriate Ready indicates a new tree with 11 and it goes back to state M1 to load the tree.

In state M47 the controller starts to pass an input to the output buffer. It starts the apropriate input with a 1 on GoBottom (2608) or a 1 on GoRight (2501), loads the output header (2856=1), and shifts the output registers (2362=1). It then goes to state M48 where it continues to shift the output register (2632=1) until the appropriate input is done, either (2503=0) or (2603=0). When the input is done, the outputbuffer is marked full (FullO=1) and the controller goes back to state M42 to await further inputs.

In state M49 the controller starts to pass an input to the intermediate buffer. It starts the appropriate input as indicated in the previous paragraph, loads the intermediate headers (2857=1), and shifts the intermediate registers (2361=1). It then goes immediately to state M50 where it continues to shift the intermediate register (2361=1) until the appropriate input is done, either (2503=0) or (2603=0). When the end of the input is indicated, the intermediate buffer is marked as full (FullI=1) and the controller goes back to state M42 to wait for possible inputs.

From the foregoing description, it will be apparent that there has been provided a computer system which can: (1) classify curves against CSG solids; (2) classify arrays of lines against CSG solids; (3) incrementally classify arrays of lines against linear and quadratic halfspaces; (4) compute shaded displays of 3D solids; (5) compute mass properties of solids such as volume and moments of inertia; and (6) compute solid interference and detect null objects. Variations and modifications of the herein described system, within the scope of the invention, will undoubtedly become apparent to those skilled in the art. The foregoing description should, therefore, be taken as illustrative and not in a limiting sense.

What is claimed is:

1. A system for the characterization of plural dimensional objects, including representing images of such objects, from the intersections of curves with primitive solids and from set operations on said intersections from which said objects can be constructed which comprises a plurality of primitive classification means for computing the intersections of a plurality of curves with said primitive solids, a plurality of means for computing classification combinations arranged with said primitive classification means in a binary tree which defines the object by constructive solid geometry, said classification combination computing means each corresponding to a different node of said tree and having means for computing a set operation for its corresponding node.

2. The system according to claim 1 wherein said tree has right and left sides and is a right-heavy binary tree.

3. The system according to claim 1 wherein said primitive classification means and said classification computing means are arranged in a ($\log_2 (N)+1) \times N$ array, where N is the number of primitive classification means.

4. The system according to claim 3 wherein said tree has right and left sides and is a right-heavy binary tree the primitive classification and classification combination computing means of which are imbedded in said array.

5. The system according to claim 4 wherein said tree has N leaves and a root, the leaves of said tree are the primitive classification means and are disposed in rows at the bottom of said array, said classification combination computing means are disposed in rows above said bottom row and the root of said tree is one of said classification combination computing means and is located in said array in the upper left corner of the uppermost row.

6. The system according to claim 5 further comprising host computer means for communicating instructions from said primitive classification means and receiving outputs from one of said classification combination computing means at the root of said tree.

7. The system according to claim 6 further comprising means included in said primitive classification means and said classification combination computing means for propagating instructions from said host computer through said primitive classification means and said classification combination computing means.

8. The system according to claim 1 further comprising host computer means for operating said primitive classification means and said classification combination computing means to classify a plurality of rays one at a time in each of said primitive classification means and the results of each plurality of rays in said classification combination computing means.

9. The system according to claim 1 wherein said primitive solids are constructed from linear and quadratic half spaces and said primitive classification means includes means for incrementally classifying said intersection with a family of straight lines which constitute said curves, said lines being defined by the following equation:

$$P(s,h;t) = (x_0 + a_0 t + a_1 h + a_2 s, + y_0 + b_0 t + \quad (1)$$
$$b_1 h + b_2 s, + z_0 + c_0 t + c_1 h + c_2 s)$$

where s, h & t are parameters defining the lines, t being points on the lines in an x, y, z coordinate system and $a_0$, $a_1$, $a_2$, $b_0$, $b_1$, $b_2$, $c_0$, $c_1$ and $c_2$ are coefficients of said parameters, and said classification means comprises means operative to solve equations the following equation for each of said lines $$t_{1,2} = B/2A \pm SQRT ((B/2A)^2 - C/A)). \quad (2)$$

resulting from the substitution of equation (1) into the equation for each of said half spaces wherein $t_{1,2}$ is the line interval between the leading and trailing intersections of said lines with said half spaces, wherein A, B & C are polynomials in (h and s), A being constant, B being a polynomial of degree one, and C being a polynomial of degree two, which equation (2) can be solved using four additions, one subtraction and one square root operation per line.

10. The system according to claim 9 wherein each primitive classification means comprises means for incrementally computing the intersection of said lines with said half spaces, means for controlling said incremental computing means, and output means connecting said incremental computing means with the one of said classification combination means above it in said tree.

11. The system according to claim 10 wherein said incremental computing means comprises means for computing $B/2A \pm SQRT ((B/2A)^2 - C/A))$, where A(h, s) is obtained by collecting all the terms that multiply $t^2$ in the equation formed when equation (1) is substituted into the equations for said half spaces, B(h, s) are all of the terms in the said formed equation t, C(h, s) is obtained by collecting all the terms in said formed equation that has no t in them.

12. The system according to claim 1 wherein said classification combination computing means is provided by a $\log_2(N) \times N$ array of identical combiner processors each comprising means combining signals corresponding to sequences of leading and trailing ends of interval segments defined by the intersections of said curves and said solids, and means for controlling the set operation performed by said combining means, N being the number of said primitive classification means.

13. The system according to claim 12 wherein said combining means comprises a min-max compare network, and said controlling means comprises programmable logic array means and host computer means, for programming said logic array means.

14. The system according to claim 13 further comprising input and output multiplexers for inputting digital signals representing said leading and trailing ends of said interval segments and deriving outputs representing leading and trailing ends of said segments from said min-max network.

* * * * *